United States Patent
Luo et al.

(10) Patent No.: US 12,017,642 B2
(45) Date of Patent: Jun. 25, 2024

(54) METHOD AND APPARATUS FOR FRONT AND REAR DRIVING TORQUE DISTRIBUTION OF VEHICLE, AND VEHICLE

(71) Applicant: HUAWEI TECHNOLOGIES CO., LTD., Guangdong (CN)

(72) Inventors: Jie Luo, Shanghai (CN); Donghao Liu, Shanghai (CN); Yongsheng Zhang, Shanghai (CN); Mingze Ling, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/342,677

(22) Filed: Jun. 27, 2023

(65) Prior Publication Data

US 2023/0339456 A1 Oct. 26, 2023

Related U.S. Application Data

(63) Continuation of application No. PCT/CN2020/141853, filed on Dec. 30, 2020.

(51) Int. Cl.
 *B60W 30/045* (2012.01)
 *B60W 10/08* (2006.01)
 *B60W 10/184* (2012.01)

(52) U.S. Cl.
 CPC .......... *B60W 30/045* (2013.01); *B60W 10/08* (2013.01); *B60W 10/184* (2013.01);
 (Continued)

(58) Field of Classification Search
 CPC .. B60W 30/045; B60W 10/08; B60W 10/184; B60W 2520/14; B60W 2520/20;
 (Continued)

(56) References Cited

U.S. PATENT DOCUMENTS

| 8,229,642 B2 * | 7/2012 | Post, II | B60W 40/064 701/48 |
| 2007/0112497 A1 * | 5/2007 | Miura | B60T 8/1755 701/41 |

(Continued)

FOREIGN PATENT DOCUMENTS

| CN | 108248454 A | 7/2018 |
| CN | 108569168 A | 9/2018 |

(Continued)

OTHER PUBLICATIONS

English Translation of CN111806248A; http://translatinportal.epo.org; Jan. 31, 2024 (Year: 2024).*

(Continued)

*Primary Examiner* — Roger L Pang
(74) *Attorney, Agent, or Firm* — HUAWEI TECHNOLOGIES CO., LTD.

(57) ABSTRACT

In a method for front-rear driving torque distribution of a vehicle, a controlling apparatus determines an expected status parameter existing during steering of a vehicle based on a wheel angle of the vehicle. The controlling apparatus determines a current correction yawing moment based on an actual status parameter existing during the steering of the vehicle and the expected status parameter, and determines a mapping relationship between a correction yawing moment and a torque distribution coefficient based on the wheel angle and acceleration information of the vehicle. The controlling apparatus then determines a torque distribution coefficient of the vehicle based on the current correction yawing moment and the mapping relationship, and determines front and rear axle driving torques of the vehicle based on the torque distribution coefficient of the vehicle.

18 Claims, 11 Drawing Sheets

(52) U.S. Cl.
CPC ..... *B60W 2510/20* (2013.01); *B60W 2520/14* (2013.01); *B60W 2520/20* (2013.01); *B60W 2520/403* (2013.01); *B60W 2710/083* (2013.01); *B60W 2710/18* (2013.01); *B60W 2720/14* (2013.01); *B60W 2720/403* (2013.01)

(58) Field of Classification Search
CPC ..... B60W 2520/403; B60W 2710/083; B60W 2720/14; B60W 30/04; B60W 30/18145; B60W 30/18172; B60W 2710/18; B60W 2720/403; B60W 2510/20
USPC ........................................ 701/69, 83, 89, 72
See application file for complete search history.

(56) References Cited

U.S. PATENT DOCUMENTS

| | | | | |
|---|---|---|---|---|
| 2016/0229291 | A1* | 8/2016 | Mao | B60K 23/0808 |
| 2018/0099677 | A1* | 4/2018 | Sugai | B60L 15/20 |
| 2020/0207332 | A1* | 7/2020 | Chatzikomis | B60L 7/00 |
| 2023/0382367 | A1* | 11/2023 | Matsuno | B60W 30/045 |

FOREIGN PATENT DOCUMENTS

| | | | |
|---|---|---|---|
| CN | 108595745 | A | 9/2018 |
| CN | 109204303 | A * | 1/2019 |
| CN | 109204303 | A | 1/2019 |
| CN | 106379198 | B | 6/2019 |
| CN | 110147628 | A | 8/2019 |
| CN | 110606075 | A | 12/2019 |
| CN | 111806248 | A * | 10/2020 |
| CN | 111806248 | A | 10/2020 |
| EP | 3284629 | A1 | 2/2018 |
| GB | 2571328 | A | 8/2019 |

OTHER PUBLICATIONS

English Translation of CN109204303A; http://translatinportal.epo.org; Jan. 31, 2024 (Year: 2024).*

* cited by examiner

METHOD AND APPARATUS FOR FRONT AND REAR DRIVING TORQUE DISTRIBUTION OF VEHICLE, AND VEHICLE

CROSS-REFERENCE TO RELATED APPLICATIONS

This application is a continuation of International Application PCT/CN2020/141853, filed on Dec. 30, 2020, the disclosure of which is hereby incorporated by reference in its entirety.

TECHNICAL FIELD

This application pertains to the field of automobile control technologies, and in particular, relates to a method and an apparatus for front and rear driving torque distribution of a vehicle, and a vehicle.

BACKGROUND

At present, in addition to being distributed based on a fixed ratio, driving torque distribution between front and rear axles of a vehicle driven in a front-to-rear centralized manner is usually based on efficiency of a motor and/or an engine or axle loads of the front and rear axles (load weights of the front and rear axles), so that the vehicle can obtain better economy and power performance. However, such distribution policy of torque between the front and rear axles does not fully consider vehicle stability. As a result, the vehicle may lose stability in a steering condition when oversteer or understeer tends to occur.

SUMMARY

This application provides a method and an apparatus for front and rear driving torque distribution of a vehicle, and a vehicle, so that a real-time torque distribution coefficient of a vehicle can be determined based on a real-time correction yawing moment of the vehicle and a mapping relationship between a correction yawing moment and a torque distribution coefficient. This improves operation stability of the vehicle during steering, and provides high applicability.

According to a first aspect, this application provides a method for front and rear driving torque distribution of a vehicle. The method includes: determining an expected status parameter existing during steering of a vehicle based on a wheel angle of the vehicle; determining a current correction yawing moment based on an actual status parameter existing during the steering of the vehicle and the expected status parameter; determining a mapping relationship between a correction yawing moment and a torque distribution coefficient based on the wheel angle and acceleration information of the vehicle; determining the torque distribution coefficient of the vehicle based on the current correction yawing moment and the mapping relationship; and determining front and rear axle driving torques of the vehicle based on the torque distribution coefficient of the vehicle.

In this embodiment of this application, a real-time torque distribution coefficient of the vehicle can be determined based on a real-time correction yawing moment of the vehicle and the mapping relationship between a correction yawing moment and a torque distribution coefficient, and further the real-time front and rear axle driving torques of the vehicle is determined. This improves stability of the vehicle, and provides high applicability.

With reference to the first aspect, in a first possible implementation, the method includes: determining maximum correctable yawing moment and minimum correctable yawing moment based on the wheel angle and the acceleration information; and determining the mapping relationship based on the wheel angle, the maximum correctable yawing moment, and the minimum correctable yawing moment.

In this embodiment of this application, the mapping relationship between a correction yawing moment and a torque distribution coefficient may be dynamically determined based on a real-time wheel angle and the acceleration information of the vehicle. This improves operation stability during steering of a vehicle.

With reference to the first aspect, in a second possible implementation, the method includes: if it is determined, based on the wheel angle, that the steering of the vehicle is to turn left, determining that the mapping relationship is $i=(\Delta M_{cor,max}-\Delta M_{req})/(\Delta M_{cor,max}-\Delta M_{cor,min})$, where i is the torque distribution coefficient, $\Delta M_{cor,max}$ is the maximum correctable yawing moment, $\Delta M_{cor,min}$ is the minimum correctable yawing moment, $\Delta M_{req}$ is the correction yawing moment, and $\Delta M_{cor,min} \leq \Delta M_{req} \leq \Delta M_{cor,max}$.

In this embodiment of this application, when it is determined that the steering of the vehicle is to turn left, and $\Delta M_{cor,min} \leq \Delta M_{req} \leq \Delta M_{cor,max}$, the mapping relationship between a correction yawing moment and a torque distribution coefficient is determined as $i=(\Delta M_{cor,max}-\Delta M_{req})/(\Delta M_{cor,max}-\Delta M_{cor,min})$.

With reference to the first aspect, in a third possible implementation, the method includes: if it is determined, based on the wheel angle, that the steering of the vehicle is to turn right, determining that the mapping relationship is $i=(\Delta M_{req}-\Delta M_{cor,min})/(\Delta M_{cor,max}-\Delta M_{cor,min})$, where i is the torque distribution coefficient, $\Delta M_{cor,max}$ is the maximum correctable yawing moment, $\Delta M_{cor,min}$ is the minimum correctable yawing moment, $\Delta M_{req}$ is the correction yawing moment, and $\Delta M_{cor,min} \leq \Delta M_{req} \leq \Delta M_{cor,max}$.

In this embodiment of this application, when it is determined that the steering of the vehicle is to turn right, and $\Delta M_{cor,min} \leq \Delta M_{req} \leq \Delta M_{cor,max}$, the mapping relationship between a correction yawing moment and a torque distribution coefficient is determined as $i=(\Delta M_{req}-\Delta M_{cor,min})/(\Delta M_{cor,max}-\Delta M_{cor,min})$.

With reference to the first aspect, in a fourth possible implementation, the method includes: obtaining a current road surface adhesion coefficient of the vehicle, and determining the maximum correctable yawing moment and the minimum correctable yawing moment based on the road surface adhesion coefficient, the wheel angle, and the acceleration information.

In this embodiment of this application, when the maximum correctable yawing moment and the minimum correctable yawing moment are determined, not only the real-time wheel angle and the acceleration information of the vehicle are considered, but also impact of the road surface adhesion coefficient on the operation stability of the vehicle during steering is considered. This improves the operation stability of the vehicle during steering.

With reference to the first aspect, in a fifth possible implementation, the method includes: determining a maximum front axle cornering force and a maximum rear axle cornering force of the vehicle based on the road surface adhesion coefficient and the acceleration information; determining the maximum correctable yawing moment based on the maximum front axle cornering force and the wheel angle; and determining the minimum correctable yawing moment based on the maximum rear axle cornering force.

In this embodiment of this application, when the maximum front axle cornering force and the maximum rear axle cornering force of the vehicle are determined, the maximum correctable yawing moment is determined based on the maximum front axle cornering force and the wheel angle and the minimum correctable yawing moment is determined based on the maximum rear axle cornering force.

With reference to the first aspect, in a sixth possible implementation, the method includes: determining a vertical load of each wheel based on a longitudinal acceleration and a lateral acceleration; and determining the maximum front axle cornering force and the maximum rear axle cornering force based on the vertical load of each wheel and the road surface adhesion coefficient.

In this embodiment of this application, when the vertical load of each wheel is obtained through calculation based on the longitudinal acceleration and the lateral acceleration, the maximum front axle cornering force and the maximum rear axle cornering force of the vehicle may be determined based on the tire ellipse theory, the vertical load of each wheel, and the road surface adhesion coefficient.

With reference to the first aspect, in a seventh possible implementation, the method includes: determining a minimum value of vertical loads of all front wheels as a corrected front axle-wheel vertical load, and determining a minimum value of vertical loads of all rear wheels as a corrected rear axle-wheel vertical load; determining the maximum front axle cornering force based on the corrected front axle-wheel vertical load and the road surface adhesion coefficient; and determining the maximum rear axle cornering force based on the corrected rear axle-wheel vertical load and the road surface adhesion coefficient.

In this embodiment of this application, a minimum value of vertical load of two wheels on a same axle is determined as corrected vertical load of the two wheels on the axle, to correct the vertical load of each wheel, so that a single wheel on the same axle can be prevented from slipping. In this way, the maximum front axle cornering force and the maximum rear axle cornering force can be determined based on the tire ellipse theory, the corrected front axle-wheel vertical load, the corrected rear axle-wheel vertical load, and the road surface adhesion coefficient.

With reference to the first aspect, in an eighth possible implementation, the method includes: if it is determined, based on the wheel angle, that the steering of the vehicle is to turn left, and the correction yawing moment is less than the minimum correctable yawing moment, determining the torque distribution coefficient of the vehicle as a first preset coefficient; if it is determined, based on the wheel angle, that the steering of the vehicle is to turn left, and the correction yawing moment is greater than the maximum correctable yawing moment, the torque distribution coefficient of the vehicle is a second preset coefficient; if it is determined, based on the wheel angle, that the steering of the vehicle is to turn right, and the correction yawing moment is less than the minimum correctable yawing moment, the torque distribution coefficient of the vehicle is a third preset coefficient; or if it is determined, based on the wheel angle, that the steering of the vehicle is to turn right, and the correction yawing moment is greater than the maximum correctable yawing moment, the torque distribution coefficient of the vehicle is a fourth preset coefficient.

In this embodiment of this application, when the correction yawing moment is less than the minimum correctable yawing moment, or the correction yawing moment is greater than the maximum correctable yawing moment, the torque distribution coefficient of the vehicle is the preset coefficient.

With reference to the first aspect, in a ninth possible implementation, the method includes: if the current correction yawing moment is less than the minimum correctable yawing moment, or the current correction yawing moment is greater than the maximum correctable yawing moment, sending a correction trigger instruction to an electronic stability control system ESC, to trigger the ESC to output a braking torque of each wheel.

In this embodiment of this application, when it is determined that the current correction yawing moment is less than the minimum correctable yawing moment, or the current correction yawing moment is greater than the maximum correctable yawing moment, ESC may be triggered to intervene, to correct a steering status of the vehicle.

With reference to the first aspect, in a tenth possible implementation, the method includes: determining the current correction yawing moment of the vehicle based on a deviation between an actual yaw velocity and an expected yaw velocity and a deviation between an actual centroid side-slip angle and an expected centroid side-slip angle.

In this embodiment of this application, when the current correction yawing moment of the vehicle is determined, impact of the yaw velocity and the centroid side-slip angle on the operation stability of the vehicle during steering are corrected. This improves the operation stability of the vehicle during steering.

With reference to the first aspect, in an eleventh possible implementation, the method includes: obtaining a total required driving torque of the vehicle; and determining the front and rear axle driving torques of the vehicle based on the total required driving torque and the torque distribution coefficient, and sending the front and rear axle driving torques to corresponding motor controllers.

In this embodiment of this application, after a front axle torque distribution coefficient and a rear axle torque distribution coefficient are determined, the front axle driving torque and the rear axle driving torque of the vehicle may be obtained based on a product of the total required driving torque of the vehicle and the front axle driving torque distribution coefficient and a product of the total required driving torque of the vehicle and the rear axle driving torque distribution coefficient respectively.

According to a second aspect, this application provides an apparatus for front and rear driving torque distribution of a vehicle. The apparatus includes a unit and/or a module configured to perform the method for front and rear driving torque distribution of a vehicle provided in any one of the first aspect and/or the possible implementations of the first aspect. Therefore, beneficial effects of the method for front and rear driving torque distribution of a vehicle according to the first aspect can also be achieved.

According to a third aspect, this application provides a vehicle. The vehicle includes the apparatus for front and rear driving torque distribution of a vehicle provided in the second aspect. Therefore, beneficial effects of the method for front and rear driving torque distribution of a vehicle according to the first aspect can also be implemented.

According to a fourth aspect, this application provides an apparatus for front and rear driving torque distribution of a vehicle. The apparatus includes a processor, a memory, and a transceiver. The processor, the memory, and the transceiver are connected to each other. The transceiver is configured to receive or send data. The memory is configured to store instructions. The processor is configured to invoke the instructions stored in the memory, to perform the method for front and rear driving torque distribution of a vehicle according to the first aspect and/or any possible implementation of the first aspect. Therefore, beneficial effects of the method for front and rear driving torque distribution of a vehicle according to the first aspect can also be implemented.

According to a fifth aspect, this application provides a computer storage medium, including computer-readable instructions. When the computer-readable instructions are run by one or more processors, the method for front and rear driving torque distribution of a vehicle according to any one of the first aspect and/or the possible implementations of the first aspect is performed. Therefore, beneficial effects of the method for front and rear driving torque distribution of a vehicle according to the first aspect can also be implemented.

In this application, the real-time torque distribution coefficient of the vehicle may be determined based on the real-time correction yawing moment of the vehicle and the real-time mapping relationship between a correction yawing moment and a torque distribution coefficient. This improves the operation stability of the vehicle during steering, and provides high applicability.

DESCRIPTION OF EMBODIMENTS

The method for front and rear driving torque distribution of a vehicle provided in this application is specifically a method for torque distribution between front and rear axles of an electric vehicle based on front-to-rear centralized driving manner in a steering working condition, and is referred to as a method for torque distribution between front and rear axles for short. The method is applicable to the vehicle control field.

Torque distribution between front and rear axles is a key technology of four-wheel drive automobiles. Power and stability performance of vehicles can be effectively improved by controlling the torque distribution between front and rear axles. At present, in addition to being distributed based on a fixed ratio, driving torque distribution between front and rear axles of a vehicle driven in a front-to-rear centralized manner is usually based on efficiency of a motor and/or an engine or axle loads of the front and rear axles (load weights of the front and rear axles), so that the vehicle can obtain better economy and power. However, such distribution policy of torque between the front and rear axles does not fully consider vehicle stability. As a result, the vehicle may lose stability in a steering condition when oversteer or understeer tends to occur.

With an advantage of fast response of a motor, vehicle control systems (such as an anti-lock brake system (ABS), a traction control system (TCS), and an electronic stability control system (ESC) can be effectively coordinated and controlled through the torque distribution between front and rear axles. An ESC dynamics control algorithm uses braking force vectoring control to provide a braking force to perform vehicle braking and an additional yawing moment to improve vehicle operation performance and stability. A torque vectoring (TV) control algorithm uses driving force vectoring control to provide a driving force to drive a vehicle and an additional yawing moment to improve vehicle operation performance and stability. A front to rear torque vectoring (FRTV) control algorithm provided in this application belongs to one of TV control algorithms.

Figure 1:
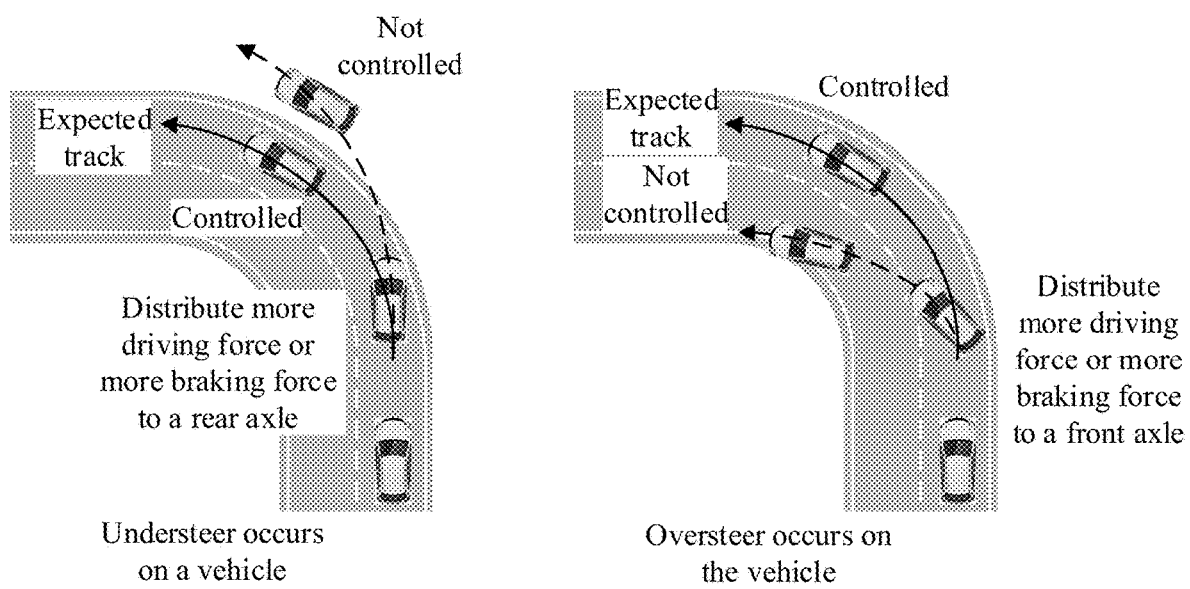
FIG. 1 is a schematic diagram of a control principle of torque distribution between front and rear axles according to this application.

FIG. 1 is a schematic diagram of a control principle of torque distribution between front and rear axles according to this application. When a vehicle has a trend of understeer in a steering working condition, a policy for controlling torque distribution between front and rear axles allocates more of a driving force to a rear axle. When the vehicle has a trend of oversteer in the steering working condition, the policy for controlling torque distribution between front and rear axles allocates more of the driving force to a front axle. Transfer of a driving torque can assist a driver in reducing a trend of understeer and a trend of oversteer of the vehicle in a steering working condition, so that the vehicle travels along an expected track. The policy for controlling torque distribution between front and rear axles provided in this application is applicable to an N-wheel drive electric vehicle, a fuel vehicle, or a hydrogen vehicle, where N is an integer greater than or equal to 2. A four-wheel drive electric vehicle is used as an example below to describe a policy for torque distribution between front and rear axles.

Figure 2:
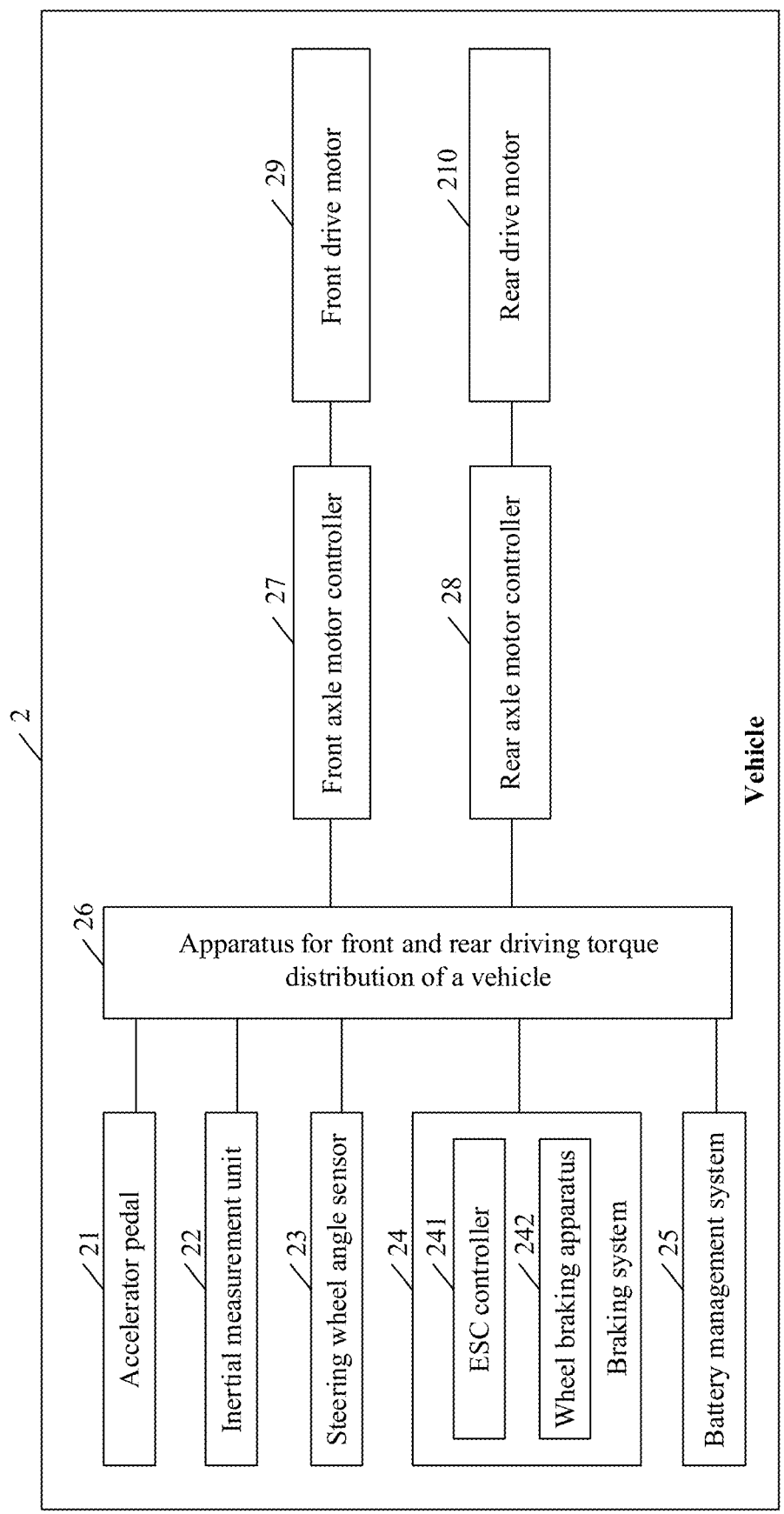
FIG. 2 is a schematic diagram of a structure of a four-wheel drive electric vehicle according to this application.

FIG. 2 is a schematic diagram of a structure of a four-wheel drive electric vehicle according to this application. As shown in FIG. 2, the vehicle 2 may include but is not limited to an accelerator pedal 21, an inertial measurement unit 22 (an apparatus for measuring three-axle attitude angles and an acceleration of an object, usually including three single-axle accelerometers and three single-axle gyroscopes), a steering wheel angle sensor 23, a braking system 24, a battery management system 25, an apparatus 26 for front and rear driving torque distribution of a vehicle, a front axle motor controller 27, a rear axle motor controller 28, a front drive motor 29, and a rear drive motor 210. The braking system 24 includes an ESC controller 241 and a wheel braking apparatus 242. In addition, the apparatus 26 for front and rear driving torque distribution of a vehicle may be a program module on a vehicle control unit board or a dedicated dynamics controller board. This is not limited herein.

An input end of the apparatus 26 for front and rear driving torque distribution of a vehicle is separately connected to the accelerator pedal 21, the inertial measurement unit 22, the steering wheel angle sensor 23, the braking system 24, and the battery management system 25 through a CAN bus. An output end of the apparatus 26 for front and rear driving torque distribution of a vehicle is separately connected to the front axle motor controller 27 and the rear axle motor controller 28 through the CAN bus. The front axle motor controller 27 is connected to the front drive motor 29, and the rear axle motor controller 28 is connected to the rear drive motor 210.

Figure 3:
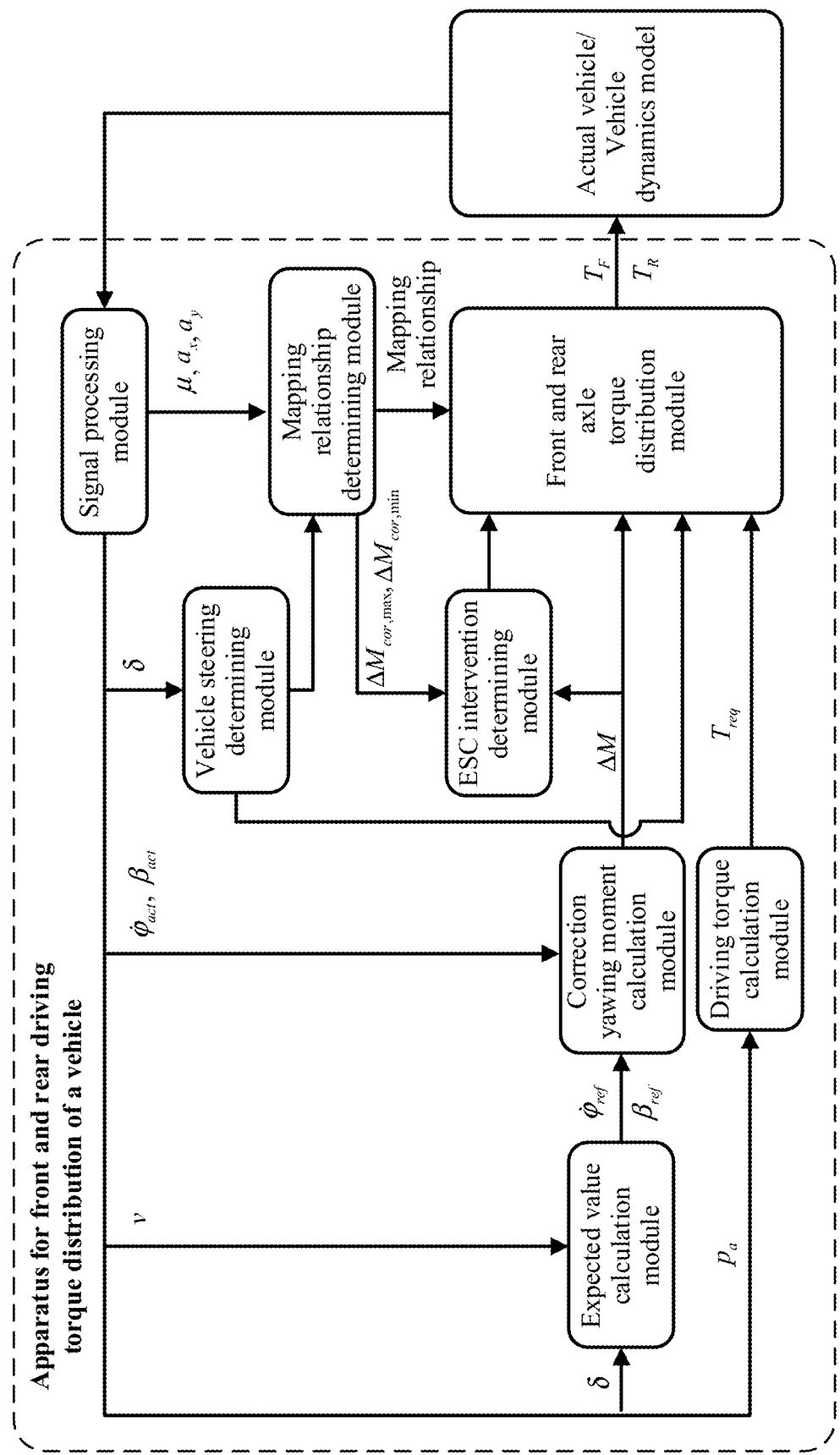
FIG. 3 is a schematic diagram of a framework of a front to rear torque vectoring control algorithm of an apparatus for front and rear driving torque distribution of a vehicle according to this application.

FIG. 3 is a schematic diagram of a framework of a front to rear torque vectoring control algorithm of an apparatus for front and rear driving torque distribution of a vehicle. As shown in FIG. 3, the control algorithm framework mainly includes an actual vehicle/vehicle dynamics model (a vehicle dynamics simulation model used to analyze smoothness and operation stability of a vehicle) and an apparatus for front and rear driving torque distribution of a vehicle (corresponding to the apparatus 26 for front and rear driving torque distribution of a vehicle in FIG. 2) shown in a dashed box. The apparatus for front and rear driving torque distribution of a vehicle includes a signal processing module, an expected value calculation module, a correction yawing torque calculation module, a driving torque calculation module, a mapping relationship determining module, a vehicle steering determining module, an ESC intervention determining module, and a front and rear axle torque distribution module. The actual vehicle/vehicle dynamics model includes an accelerator pedal 21, an inertial measurement unit 22, a steering wheel angle sensor 23, a braking system 24, a battery management system 25, a front axle motor controller 27, a rear axle motor controller 28, a front drive motor 29, and a rear drive motor 210.

In some feasible implementations, with reference to FIG. 2 and FIG. 3, the signal processing module receives an accelerator pedal location $p_a$ sent by the accelerator pedal 21, obtains effective power of a power battery provided by the battery management system 25, and sends $p_a$ and the effective power of the power battery to the driving torque calculation module. The driving torque calculation module may calculate a first output driving torque based on $p_a$, determine, based on the effective power of the power battery, a second output driving torque supported by the power battery, and determine a minimum value of the first output driving torque and the second output driving torque as a total required driving torque $T_{req}$ of the vehicle.

The signal processing module receives an actual yaw velocity $\varphi_{act}$, a longitudinal acceleration $a_x$, and a lateral acceleration $a_y$ that are sent by the inertial measurement unit 22, and a steering wheel angle $\delta$ sent by the steering wheel angle sensor 23, obtains a vehicle speed $v$, a road surface adhesion coefficient $\mu$, and an actual centroid side-slip angle $\beta_{act}$ through calculation based on the foregoing parameters, sends $v$, and $\delta$ to the expected value calculation module, sends $\mu$, $a_x$, and $a_y$ to the mapping relationship determining module, and sends $\delta$ to the vehicle steering determining module.

The expected value calculation module calculates an expected yaw velocity $\varphi_{ref}$ and an expected centroid side-slip angle $\beta_{ref}$ based on $v$ and $\delta$, and sends $\varphi_{ref}$ and $\beta_{ref}$ to the correction yawing moment calculation module.

The correction yawing moment calculation module obtains a current correction yaw torque $\Delta M$ of the vehicle through calculation based on an error $\Delta\varphi=\varphi_{act}-\varphi_{ref}$ act ref between the actual yaw velocity and the expected yaw velocity, and an error $\Delta\beta=\beta_{act}-\beta_{ref}$ between the actual centroid side-slip angle and the expected centroid side-slip angle. It may be understood that $\Delta M$ is a yawing moment used to correct a steering status of the vehicle. Then, the correction yawing moment calculation module sends $\Delta M$ to the front and rear axle torque distribution module and the ESC intervention determining module separately.

The vehicle steering determining module may obtain a front wheel angle $\delta_f$ through calculation based on $\delta=\delta_f*i$, where i is a transfer ratio between a steering wheel to a front axle steering wheel, and then determine steering of the vehicle based on $\delta_f$, and separately send the steering of the vehicle to the mapping relationship determining module and the front and rear axle torque distribution module.

The mapping relationship determining module obtains, through calculation based on $\mu$, $a_x$, and $a_y$, a maximum correctable yawing moment $\Delta M_{cor,max}$ and a minimum correctable yawing moment $\Delta M_{cor,min}$ that can be implemented through torque distribution between front and rear axles, determines a mapping relationship between a correction yawing moment and a torque distribution coefficient based on the steering of the vehicle, $\Delta M_{cor,max}$, and $\Delta M_{cor,min}$, sends the mapping relationship between a correction yawing moment and a torque distribution coefficient to the front and rear axle torque distribution module, and sends $\Delta M_{cor,max}$ and $\Delta M_{cor,min}$ to the ESC intervention determining module. The foregoing mapping relationship is applicable to a case in which the correction yawing moment is greater than or equal to $\Delta M_{cor,min}$, and the correction yawing moment is less than or equal to $\Delta M_{cor,max}$.

The ESC intervention determining module may determine whether an ESC function is required to intervene based on a value relationship between $\Delta M$, $\Delta M_{cor,min}$, and $\Delta M_{cor,max}$. When $\Delta M_{cor,min} \leq \Delta M \leq \Delta M_{cor,max}$, the ESC function does not intervene; or when $\Delta M < \Delta M_{cor,min}$ or $\Delta M > \Delta M_{cor,max}$, the ESC function intervenes, and an ESC intervention determining result is sent to the front and rear axle torque distribution module.

Then, when determining that an ESC intervention determining result is being not to intervene, the front and rear axle torque distribution module determines a front axle torque distribution coefficient and a rear axle torque distribution coefficient based on the mapping relationship and $\Delta M$, and obtains the front axle driving torque $T_F$ and the rear axle driving torque $T_R$ of the vehicle through calculation based on the front axle torque distribution coefficient and the rear axle torque distribution coefficient and $T_{req}$, and then outputs $T_F$ and $T_R$ respectively to the front axle motor controller 27 and the rear axle motor controller 28. The front axle motor controller 27 controls, based on $T_F$, the front drive motor 29 to run, and the rear axle motor controller 28 controls, based on $T_R$, the rear drive motor 210 to run.

Further, when determining that an ESC intervention determining result is being to intervene, the front and rear axle torque distribution module determines the front axle torque distribution coefficient and the rear axle torque distribution coefficient as preset coefficients based on the steering of the vehicle, obtains $T_F$, and $T_R$, through calculation based on the preset coefficients and $T_{req}$, and outputs $T_F$ and $T_R$ to the front axle motor controller 27 and the rear axle motor controller 28 respectively. The front axle motor controller 27 controls, based on $T_F$, the front drive motor 29 to run, and the rear axle motor controller 28 controls, based on $T_R$, the rear drive motor 210 to run, to help the driver reduce a trend of understeer and a trend of oversteer in a steering working condition, so as to improve steering stability of the vehicle.

In addition, after the ESC intervention determining module determines that the ESC intervention determining result is being to intervene, that is, after it is determined that the ESC intervention determining result is being to intervene, the apparatus 26 for front and rear driving torque distribution of a vehicle sends a correction trigger instruction to the ESC controller 241 in the braking system 24. The ESC controller 241 obtains a braking torque of each wheel through calculation based on the instruction, and outputs the braking torque of each wheel to the wheel braking apparatus 242 corresponding to each wheel.

In this embodiment of this application, the apparatus 26 for front and rear driving torque distribution of a vehicle may dynamically perform torque distribution between front and rear axles based on real-time steering of the vehicle, the current correction yawing moment, and the mapping relationship between a correction yawing moment and a torque distribution coefficient, to improve operation stability and a track tracking capability of the vehicle in a steering working condition.

The following describes, with reference to the apparatus for front and rear driving torque distribution of a vehicle shown in FIG. 2, a specific implementation of the method for front and rear driving torque distribution of a vehicle provided in embodiments of this application.

Figure 4:
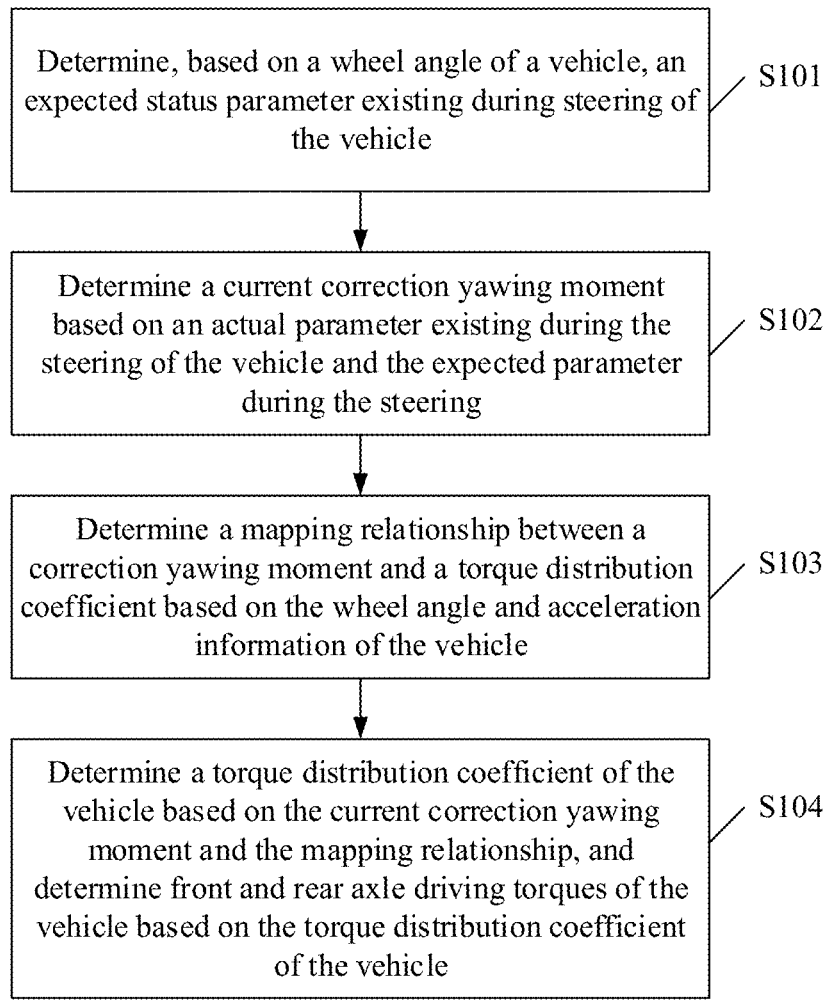
FIG. 4 is a schematic flowchart of a method for front and rear driving torque distribution of a vehicle according to this application.

FIG. 4 is a schematic flowchart of a method for front and rear driving torque distribution of a vehicle. The method for front and rear driving torque distribution of a vehicle provided in this embodiment of this application may include the following steps.

S101: Determine, based on a wheel angle of a vehicle, an expected status parameter existing during steering of the vehicle.

The expected status parameter includes an expected yaw velocity and an expected centroid side-slip angle.

In some feasible implementations, the apparatus 26 for front and rear driving torque distribution of a vehicle may establish a two-degree-of-freedom vehicle model of the vehicle, and obtain an actual yaw velocity $\dot{\varphi}_{act}$, a longitudinal acceleration $a_x$, and a lateral acceleration $a_y$ of the vehicle by using the inertial measurement unit 22, obtain a steering wheel angle $\delta$ by using the steering wheel angle sensor 23, and calculate a longitudinal vehicle speed estimation value $v_x'$ and a lateral vehicle speed estimation value $v_y'$ of the vehicle based on $\dot{\varphi}_{act}$, $a_x$ and $a_y$ as well as the two-degree-of-freedom vehicle model of the vehicle. A longitudinal speed $v_x$ and a lateral speed $v_y$ of the vehicle are calculated by using the extended Kalman filter and based on $v_x'$, $v_y'$, $a_x$, and $a_y$. Then, the apparatus 26 for front and rear driving torque distribution of a vehicle may obtain the expected yaw velocity $\dot{\varphi}_{ref}$ and the expected centroid side-slip angle $\beta_{ref}$ through calculation based on $\delta$, $v_x$, and $v_y$ as well as the two-degree-of-freedom vehicle model of the vehicle.

S102: Determine a current correction yawing moment based on an actual status parameter existing during the steering of the vehicle and the expected status parameter.

The actual status parameter includes an actual yaw velocity and an actual centroid side-slip angle.

Before performing step S102, the apparatus 26 for front and rear driving torque distribution of a vehicle may obtain, through calculation based on $v_x$ and $v_y$, a speed $v$ of the vehicle, and obtain the actual centroid side-slip angle $\beta_{act}$ through calculation based on $v$.

Then, the apparatus 26 for front and rear driving torque distribution of a vehicle determines the current correction yawing torque of the vehicle based on $\beta_{act}$, $\dot{\varphi}_{act}$, $\dot{\varphi}_{ref}$, and $\beta_{ref}$.

In some feasible implementations, the apparatus 26 for front and rear driving torque distribution of a vehicle determines the current correction yawing torque $\Delta M$ of the vehicle based on a deviation $\Delta\dot{\varphi}=\dot{\varphi}_{act}-\dot{\varphi}_{ref}$ between $\dot{\varphi}_{act}$ and $\dot{\varphi}_{ref}$, and a deviation $\Delta\beta=\beta_{act}-\beta_{ref}$ between $\beta_{act}$ and $\beta_{ref}$.

In an embodiment, $\Delta\dot{\varphi}$ and $\Delta\beta$ may be used as input parameters of a proportional-integral-differential (PID) control algorithm to determine the current correction yawing moment $\Delta M$ of the vehicle.

In another embodiment, a fuzzy control algorithm may be used, $\Delta\dot{\varphi}$ and $\Delta\beta$ are used as input, and $\Delta M$ is used as output, a triangular membership function is used for $\Delta\dot{\varphi}$, $\Delta\beta$, and $\Delta M$. $\Delta\dot{\varphi}$ and $\Delta\beta$ are divided into seven fuzzy subsets: NB (negative big), NM (negative medium), NS (negative small), ZE (zero), PS (positive small), PM (positive medium), and PB (positive big). To improve control precision, the output additional yawing moment is divided into nine fuzzy subsets: NVB (negative very big), NB (negative big), NM (negative medium), NS (negative small), ZE (zero), PS (positive small), PM (positive medium), PB (positive big), and PVB (positive very big). Then, a fuzzy quantity is output based on a fuzzy control rule. The fuzzy control rule may be as follows: when understeer occurs ($\Delta\dot{\varphi}<0$), a positive correction yawing moment needs to be applied to reduce a trend of understeer of the vehicle, and $\Delta M$ is determined based on $\Delta\dot{\varphi}$ and $\Delta\beta$. When an absolute value $|\Delta\dot{\varphi}|$ of a yaw velocity error is large, a large $\Delta M$ is output, and when $|\Delta\dot{\varphi}|$ is small, a positive correction yawing moment $\Delta M$ increases with an increase of an absolute value $|\Delta\beta|$ of a centroid side-slip angle error. When oversteer occurs ($\Delta\dot{\varphi}>0$), a negative correction yawing moment needs to be applied to reduce a trend of oversteer of the vehicle, and $\Delta M$ is determined based on $\Delta\dot{\varphi}$ and $\Delta\beta$. When $|\Delta\dot{\varphi}|$ is large, a negative correction yawing moment $\Delta M$ with a large absolute value is output. When $|\Delta\dot{\varphi}|$ is small, an absolute value of the negative correction yawing moment $\Delta M$ decreases with a decrease of $|\Delta\beta|$. Afterward, the center of gravity method is used to convert the output fuzzy quantity into an accurate control quantity, and the current correction yawing moment $\Delta M$ of the vehicle is obtained.

S103: Determine a mapping relationship between a correction yawing moment and a torque distribution coefficient based on the wheel angle and acceleration information of the vehicle.

The wheel angle may be a front wheel angle, and the acceleration information includes a longitudinal acceleration and a lateral acceleration.

In a feasible implementation, the apparatus for front and rear driving torque distribution of a vehicle obtains a current road surface adhesion coefficient of the vehicle, determines a vertical load of each wheel of the vehicle based on the longitudinal acceleration and the lateral acceleration, determines a minimum value of vertical loads of all front wheels as a corrected front axle-wheel vertical load, determines a minimum value of vertical loads of all rear wheels as a corrected rear axle-wheel vertical load, determines a maximum front axle cornering force based on the corrected front axle-wheel vertical load and the road surface adhesion coefficient, and determines a maximum rear axle cornering force based on the corrected rear axle-wheel vertical load and the road surface adhesion coefficient. The maximum correctable yawing moment is determined based on the maximum front axle cornering force and the wheel angle, and the minimum correctable yawing moment is determined based on the maximum rear axle cornering force.

Specifically, the apparatus 26 for front and rear driving torque distribution of a vehicle may obtain a left front wheel side-slip angle $\delta_{f1}$ and a right front wheel side-slip angle $\delta_{f2}$, through calculation based on the longitudinal speed $v_x$ and a lateral speed $v_y$ of the vehicle, the actual yaw velocity $\dot{\varphi}_{act}$, a yaw velocity gain $\Delta\dot{\varphi}$, and the two-degree-of-freedom vehicle model, and input $\dot{\varphi}_{act}$, $\Delta\dot{\varphi}$, $\delta_{f1}$, and $\delta_{f2}$ into a BP neural network structure. The current road surface adhesion coefficient $\mu$ of the vehicle is estimated by using a BP neural network algorithm.

Figure 5:
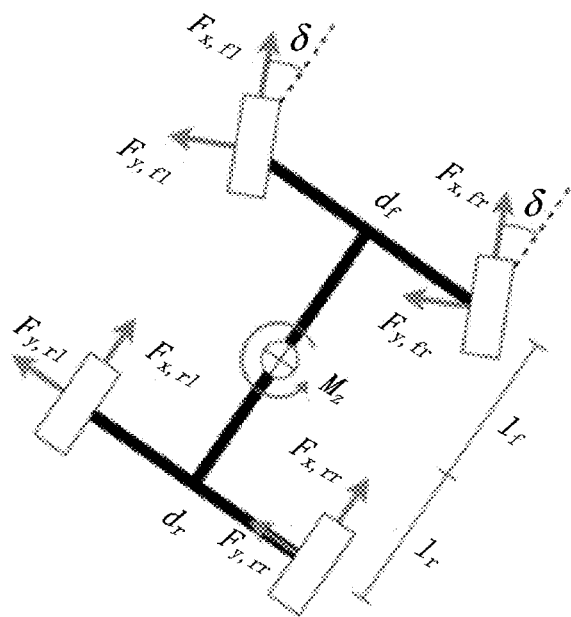
FIG. 5 is a schematic diagram of a vehicle dual-track model according to this application.

Then, the vertical load of each wheel of the vehicle is determined based on the longitudinal acceleration and the lateral acceleration. FIG. 5 is a schematic diagram of a vehicle dual-track model. Based on the vehicle dual-track model shown in FIG. 5, when the vehicle is in a steering working condition, the longitudinal acceleration and the lateral acceleration of the vehicle cause transfer of vertical loads of four wheels, and the vertical loads of the four wheels may be obtained through calculation by using the following formulas:

$$F_{z,FL}=0.5mgl_r/(l_f+l_r)-0.5ma_xh/(l_f+l_r)-ma_yl_r h/((l_f+l_r)*d_f)$$

$$F_{z,FR}=0.5mgl_r/(l_f+l_r)-0.5ma_xh/(l_f+l_r)+ma_yl_r h/((l_f+l_r)*d_f)$$

$$F_{z,RL}=0.5mgl_f/(l_f+l_r)+0.5ma_xh/(l_f+l_r)-ma_yl_r h/((l_f+l_r)*d_r)$$

$$F_{z,RR}=0.5mgl_f/(l_f+l_r)+0.5ma_xh/(l_f+l_r)+ma_yl_r h/((l_f+l_r)*d_r)$$

$F_{z,FL}$, $F_{z,FR}$, $F_{z,RL}$, and $F_{z,RR}$ are respectively a vertical load of a left front wheel, a vertical load of a right front wheel, a vertical load of a left rear wheel, and a vertical load of a right rear wheel in the vehicle dual-track model shown in FIG. 5. m is a vehicle weight, $a_x$ is a longitudinal acceleration of the vehicle, $a_y$ is a lateral acceleration of the vehicle, h is a height of a vehicle centroid, $l_f$ is a distance from a front axle to the vehicle centroid, $l_r$ is a distance from a rear axle to the vehicle centroid, and $d_f$ is a length of the front axle of the vehicle, and $d_r$ is a length of the rear axle of the vehicle.

It may be understood that the vertical load of each wheel is a sum of a static load $0.5\ mgl_r/(l_f+l_r)$ of the vehicle, a variation that is of a wheel load and that is caused by a longitudinal inertia force, and a variation that is of the wheel load and that is caused by a lateral inertia force.

To avoid slipping of a single wheel on a same axle, vertical loads of the left and right wheels on the same axle are corrected. A minimum value of the vertical loads of the left and right wheels on the front axle is determined as the corrected front-axle wheel vertical load, and a minimum value of the vertical loads of the left and right wheels on the rear axle is determined as the corrected rear axle-wheel vertical load, that is, $$F_{z,FL,cor}=F_{z,FR,cor}=\min(F_{z,FL},F_{z,FR})=0.5mgl_r/(l_f+l_r)-0.5ma_xh/(l_f+l_r)-ma_yl_r h/((l_f+l_r)*d_f)$$

$$F_{z,RL,cor}=F_{z,RR,cor}=\min(F_{z,RL},F_{z,RR})=0.5mgl_f/(l_f+l_r)+0.5ma_xh/(l_f+l_r)-ma_yl_r h/((l_f+l_r)*d_r)$$

$F_{z,FL,cor}$, $F_{z,FR,cor}$, $F_{z,RL,cor}$, and $F_{z,RR,cor}$ are respectively a corrected vertical load of the left front wheel, a corrected vertical load of the right front wheel, a corrected vertical load of the left rear wheel, and a corrected vertical load of the right rear wheel.

Then, the apparatus 26 for front and rear driving torque distribution of a vehicle may determine the maximum front axle cornering force based on the corrected front axle-wheel vertical load and the road surface adhesion coefficient, and determine the maximum rear axle cornering force based on the corrected rear axle-wheel vertical load and the road surface adhesion coefficient.

Figure 6:
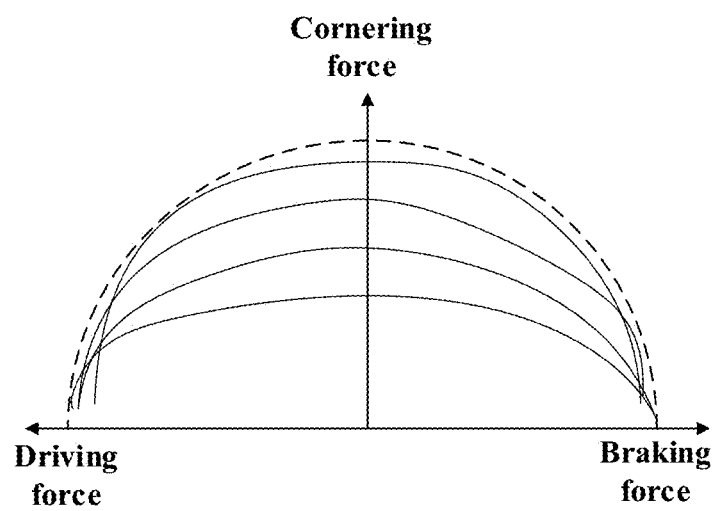
FIG. 6 is a schematic diagram of a tire characteristic curve according to an embodiment of this application.

Specifically, FIG. 6 is a schematic diagram of a tire characteristic curve according to an embodiment of this application. A cornering force and a longitudinal force are usually applied to a tire at the same time. As shown in FIG. 6, when a driving force or a braking force increases, the cornering force decreases; and when the driving force or the braking force decreases, the cornering force increases. In addition to being affected by the driving force and the braking force, the cornering force is also related to a side-slip angle of the tire. A larger side-slip angle of the tire indicates a larger cornering force, as shown by different curves in FIG. 6. An envelope of this set of curves is close to an ellipse, usually referred to as a tire ellipse, which determines a limit value of a resultant force of a driving force or a braking force, and the cornering force under a specific adhesion condition.

In actual working conditions, the tire is affected by longitudinal, lateral and vertical forces, but when a vertical load and a road surface adhesion coefficient are not changed, a resultant force generated in a tire tread imprint is fixed, and a relationship between the three may be expressed as $\mu F_z=\sqrt{F_x^2+F_y^2}$, where is a road surface adhesion coefficient $\mu$, and $F_x$, $F_y$, and $F_z$ are longitudinal, lateral and vertical forces subjected to the tire respectively.

It can be learned based on FIG. 6 that when a driving force to which each wheel is subjected is 0, a cornering force to which each wheel is subjected is the largest. The left front wheel in FIG. 5 is used as an example to calculate a maximum cornering force of the left front wheel. Refer to FIG. 5. $F_{x,fl}$ is a driving force of the left front wheel of the vehicle, $F_{y,fl}$ is a cornering force of the left front wheel of the vehicle, and $\delta_f$ is a front wheel angle of the vehicle. When $F_{x,fl}=0$, longitudinal and lateral forces applied to the left wheel are respectively $F_{y,fl}*\sin\delta_f$ and $F_{y,fl}*\cos\delta_f$. $\mu F_{z,FL,cor}=\sqrt{(F_{y,fl}*\sin\delta_f)^2+(F_{y,fl}*\cos\delta_f)^2}=F_{y,fl}$ may be obtained based on the formula $\mu F_z=\sqrt{F_x^2+F_y^2}$, that is, the maximum cornering force of the left front wheel is $\mu F_{z,FL,cor}$. Similarly, it can be learned that a maximum cornering force of the right front wheel is $\mu F_{z,FR,cor}$, a maximum cornering force of the left rear wheel is $\rho F_{z,RL,cor}$, and a maximum cornering force of the right rear wheel is $\mu F_{z,RR,cor}$. In this case, the maximum front axle cornering force is $F_{y,F,max}=\mu(F_{z,FL,cor}+F_{z,FR,cor})$ and the maximum rear axle cornering force is $F_{y,R,max}=\mu(F_{z,RL,cor}+F_{z,RR,cor})$. Further, it can be learned from FIG. 6 that a minimum front axle cornering force $F_{y,F,min}=0$, and a minimum rear axle cornering force $F_{y,R,min}=0$.

Then, the apparatus 26 for front and rear driving torque distribution of a vehicle may determine the maximum correctable yawing moment $\Delta M_{cor,max}$ based on the maximum front axle cornering force $F_{y,F,max}$ and the front wheel angle $\delta_f$, and determine the minimum correctable yawing moment $\Delta M_{cor,min}$ based on the maximum rear axle cornering force $F_{y,R,max}$.

$$\Delta M_{cor,max} = F_{y,F,max} * \cos \delta_f * l_f - F_{y,R,min} * l_r = F_{y,F,max} * \cos \delta_f * l_f =$$
$$\mu(mgl_r/(l_f + l_r) - ma_xh/(l_f + l_r) - 2ma_yl_rh/((l_f + l_r)*d_f)) * \cos \delta_f * l_f$$

$$\Delta M_{cor,min} = F_{y,f,F,min} * \cos \delta_f * l_f - F_{y,R,max} * l_r = -F_{y,R,max} * l_r = -$$
$$\mu(mgl_f/(l_f + l_r) + ma_xh/(l_f + l_r) - 2ma_yl_fh/((l_f + l_r)*d_r)) * l_r$$

The steering of the vehicle is determined based on the front wheel angle $\delta_f$ (for example, when $\delta_f>0$, the steering of the vehicle is to turn right). The mapping relationship between a correction yawing moment and a torque distribution coefficient is further determined by the steering of the vehicle, the minimum correctable yawing moment and the maximum correctable yawing moment.

Figure 7:
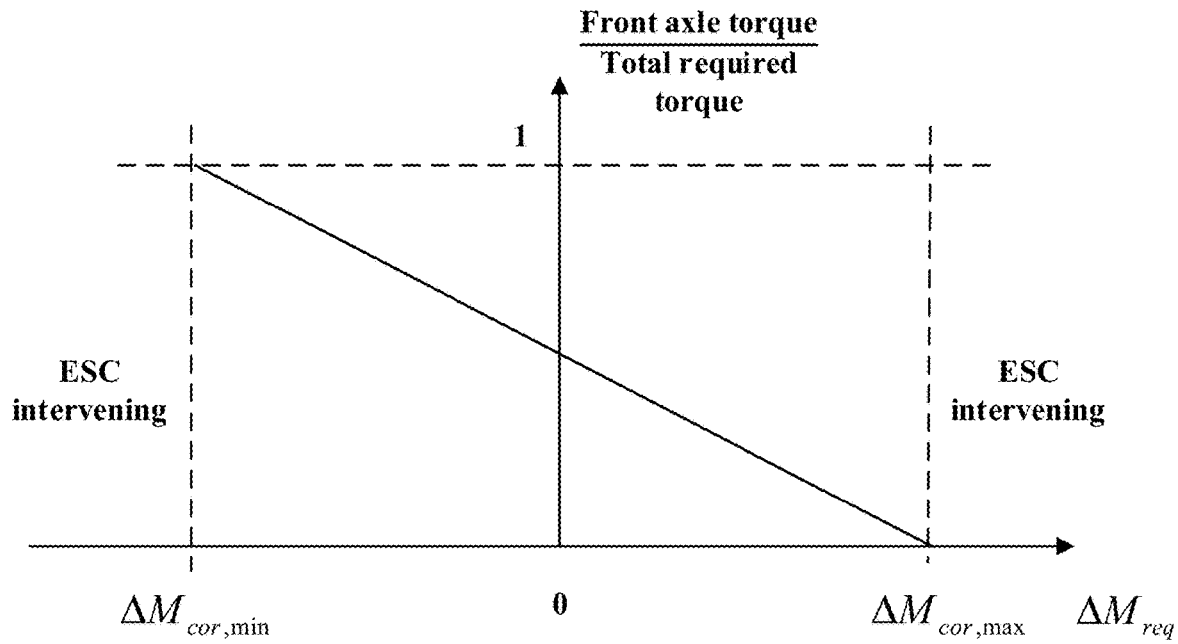
FIG. 7 is a diagram of a mapping relationship between a correction yawing moment and a torque distribution coefficient in a left-turn working condition according to this application.

When it is determined that the steering of the vehicle is to turn left, the mapping relationship between a correction yawing moment and a torque distribution coefficient is determined based on the minimum correctable yawing moment and the maximum correctable yawing moment:

In an implementation, FIG. 7 is a diagram of a mapping relationship between a correction yawing moment and a torque distribution coefficient in a left-turn working condition according to this application. As shown in FIG. 7, a horizontal coordinate is the real-time correction yawing moment $\Delta M_{req}$ of the vehicle, $\Delta M_{cor,max}$ and $\Delta M_{cor,min}$ are the maximum correctable yawing moment and the minimum correctable yawing moment. A vertical coordinate is a ratio of a front axle driving torque to a total required driving torque of the vehicle, that is, a front axle torque distribution coefficient. When the vertical coordinate is 1, it indicates that the vehicle is in a front wheel driving mode. When the vertical coordinate is 0, it indicates that the vehicle is in a rear wheel driving mode. When the vertical coordinate is between 0 and 1, it indicates that the vehicle is in a four wheel driving mode.

When the vehicle turns left, if $\Delta M_{cor,min} \leq \Delta M_{req} < 0$, because $\Delta M_{req} < 0$, it indicates that the yawing moment used to correct the steering status of the vehicle, that is $\Delta M_{req}$, enables the vehicle to generate an effect of rotating clockwise around the vehicle centroid. That the vehicle turns left means that the vehicle actually moves in a counter-clockwise direction. Therefore, it may be determined that the vehicle has a trend of relative oversteer. It can be learned from FIG. 7 that, in this case, the driving torque of the vehicle is required to be transferred to the front axle. If $0<\Delta M_{req} \leq \Delta M_{cor,max}$, because $\Delta M_{req}>0$, it indicates that the yawing moment used to correct the steering status of the vehicle, that is req enables the vehicle to generate an effect of rotating counter-clockwise around the vehicle centroid. That the vehicle turns left means that the vehicle actually moves in a counter-clockwise direction. Therefore, it may be determined that the vehicle has a trend of relative understeer. With reference to FIG. 7, it can be learned that in this case, the driving torque of the vehicle is required to be transferred to the rear axle.

Further, with reference to FIG. 7, it can be learned that when $\Delta M_{cor,min} \leq \Delta M_{req} \leq \Delta M_{cor,max}$, the mapping relationship between a correction yawing moment and a torque distribution coefficient is $i_F=(\Delta M_{cor,max}-\Delta M_{req})/(\Delta M_{cor,max}-\Delta M_{cor,min})$, where is $i_F$ a front axle torque distribution coefficient.

Figure 8:
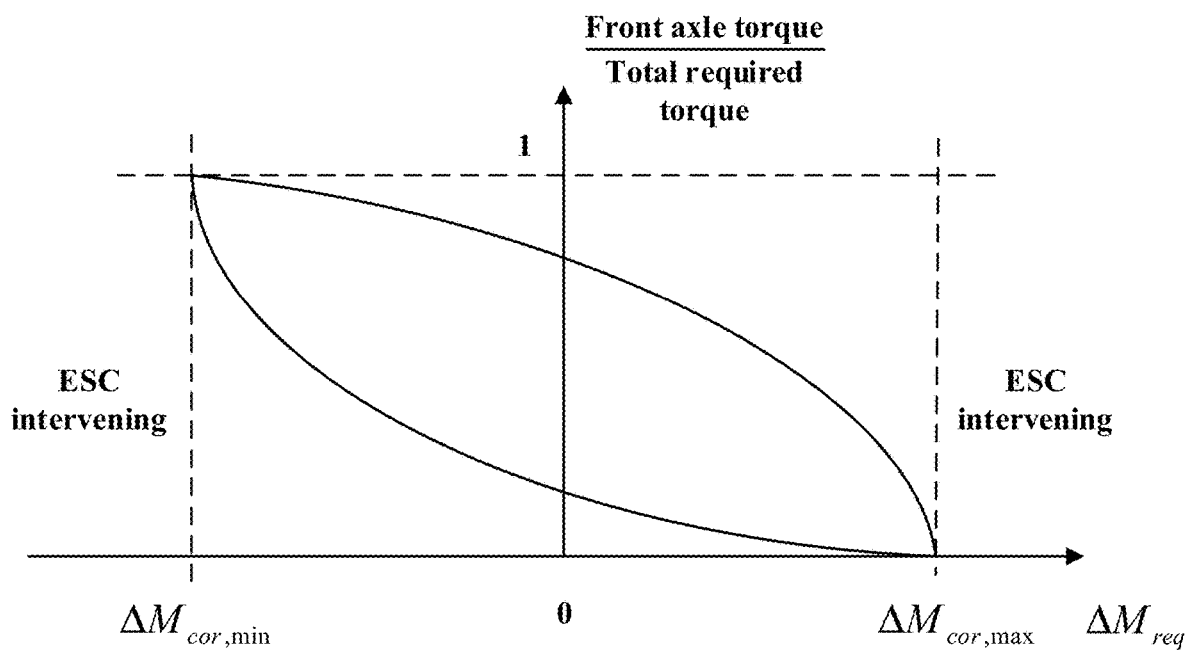
FIG. 8 is another diagram of a mapping relationship between a correction yawing moment and a torque distribution coefficient in a left-turn working condition according to this application.

In another implementation, FIG. 8 is another diagram of a mapping relationship between a correction yawing moment and a torque distribution coefficient in a left-turn working condition according to this application. As shown in FIG. 8, when the vehicle turns left, the diagram indicating the mapping relationship between a correction yawing moment and a torque distribution coefficient may be a monotonically decreasing convex function curve, or may be a monotonically decreasing concave function curve.

If $\Delta M_{cor,min} \leq \Delta M_{req} < 0$, it may be determined that the vehicle has a trend of relative oversteer. With reference to FIG. 8, it can be learned that in this case, the driving torque of the vehicle is required to be transferred to the front axle; or if $0<\Delta M_{req} \leq \Delta M_{cor,max}$, it may be determined that the vehicle has a relative understeer trend. It can be learned with reference to FIG. 8 that, in this case, the driving torque of the vehicle is required to be transferred to the rear axle. Further, it is assumed that an expression of the convex function or the concave function that represents the mapping relationship between a correction yawing moment and a torque distribution coefficient FIG. 8 is $y=f_1(x)$, where x is a correction yawing moment, and y is a front axle torque distribution coefficient. When $\Delta M_{cor,min} \leq \Delta M_{req} \leq \Delta M_{cor,max}$, the mapping relationship between a correction yawing moment and a torque distribution coefficient is $i_F=f_1(\Delta M_{req})$, where $i_F$ is a front axle torque distribution coefficient.

Figure 9:
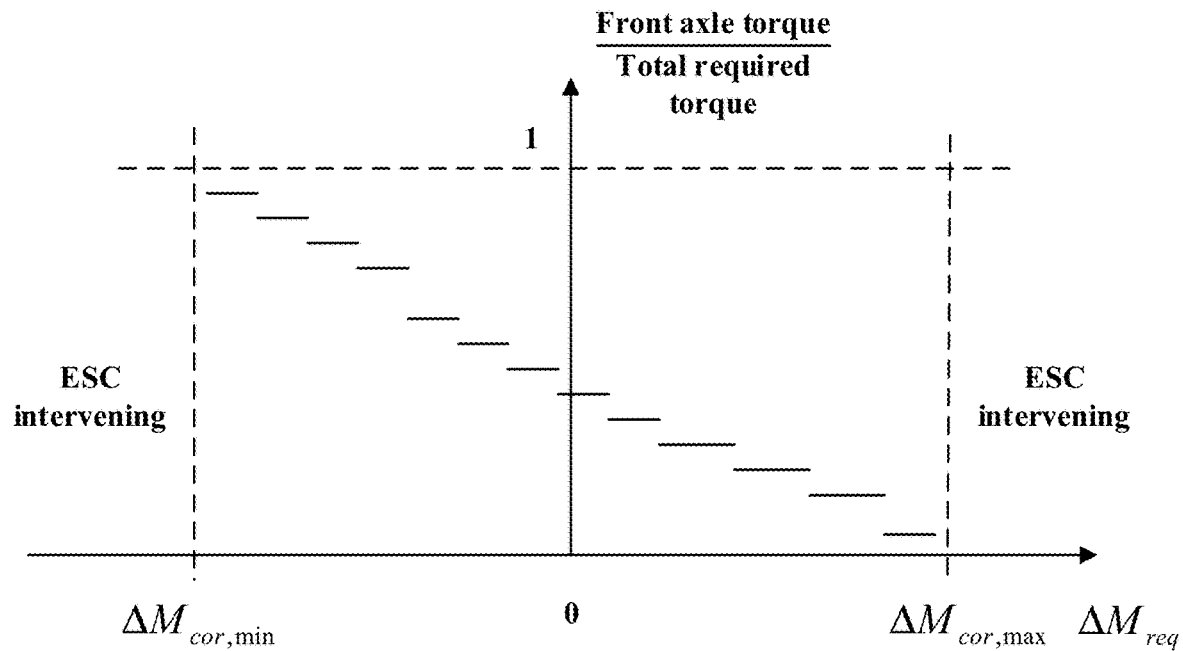
FIG. 9 is still another diagram of a mapping relationship between a correction yawing moment and a torque distribution coefficient in a left-turn working condition according to this application.

In still another implementation, FIG. 9 is still another diagram of a mapping relationship between a correction yawing moment and a torque distribution coefficient in a left-turn working condition according to this application. As shown in FIG. 9, when the vehicle turns left, the diagram indicating the mapping relationship between a correction yawing moment and a torque distribution coefficient may be a diagram in which different front axle torque distribution coefficients are used for different correction yawing moment intervals. A length of the correction yawing moment interval may be changed based on an actual requirement. This is not limited herein. If $\Delta M_{cor,min} \leq \Delta M_{req} < 0$, it may be determined that the vehicle has a trend of relative oversteer. With reference to FIG. 9, it can be learned that in this case, the driving torque of the vehicle is required to be transferred to the front axle. If $0<\Delta M_{req} \leq \Delta M_{cor,max}$, it may be determined that the vehicle has a relative understeer trend. It can be learned with reference to FIG. 9 that, in this case, the driving torque of the vehicle is required to be transferred to the rear axle. Further, when $\Delta M_{cor,min} \leq \Delta M_{req} \leq \Delta M_{cor,max}$, the mapping relationship between a correction yawing moment and a torque distribution coefficient may be obtained by looking up a table.

Figure 10:
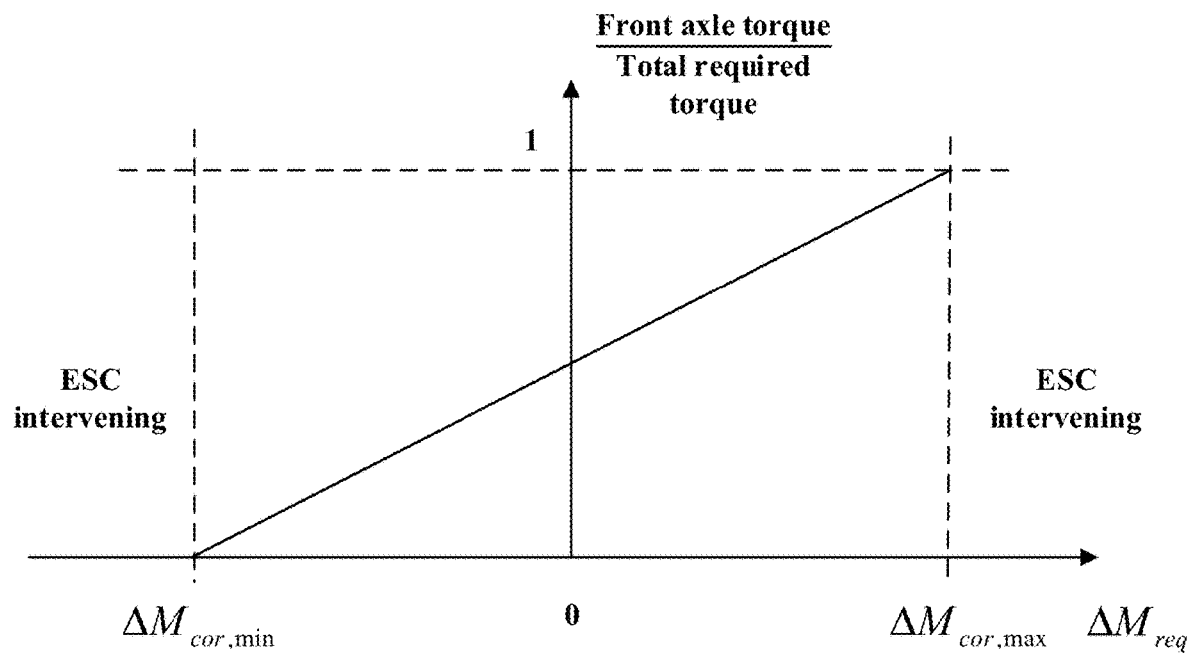
FIG. 10 is a diagram of a mapping relationship between a correction yawing moment and a torque distribution coefficient in a right-turn working condition according to this application.

When it is determined that the steering of the vehicle is to turn right, the mapping relationship between a correction yawing moment and a torque distribution coefficient is determined based on the minimum correctable yawing moment and the maximum correctable yawing moment:

FIG. 10 is a diagram of a mapping relationship between a correction yawing moment and a torque distribution coefficient in a right-turn working condition according to this application.

When the vehicle turns right, if $\Delta M_{cor,min} \leq \Delta M_{req} < 0$, because $\Delta M_{req}<0$, indicates that the yawing moment used to correct the steering status of the vehicle, that is $\Delta M_{req}$, enables the vehicle to generate an effect of rotating clockwise around the vehicle centroid. That the vehicle turns right means that the vehicle actually moves in a clockwise direction. Therefore, it may be determined that the vehicle has a trend of relative understeer. It can be learned with reference to FIG. 10 that, in this case, the driving torque of the vehicle is required to be transferred to the rear axle. If $0 < \Delta M_{req} \leq \Delta M_{cor,max}$, because $\Delta M_{req} > 0$, indicates that the yawing moment used to correct the steering status of the vehicle, that is $\Delta M_{req}$, enables the vehicle to generate an effect of rotating counter-clockwise around the vehicle centroid. That the vehicle turns right means that the vehicle actually moves in a clockwise direction. Therefore, it may be determined that the vehicle has a trend of relative oversteer. With reference to FIG. 10, it can be learned that in this case, the driving torque of the vehicle is required to be transferred to the front axle.

Further, with reference to FIG. 10, it can be learned that when $\Delta M_{cor,min} \leq \Delta M_{req} \leq \Delta M_{cor,max}$, the mapping relationship between a correction yawing moment and a torque distribution coefficient is $i_F = (\Delta M_{req} - \Delta M_{cor,min})/(\Delta M_{cor,max} - \Delta M_{cor,min})$, where $i_F$ a front axle torque distribution coefficient.

Figure 11:
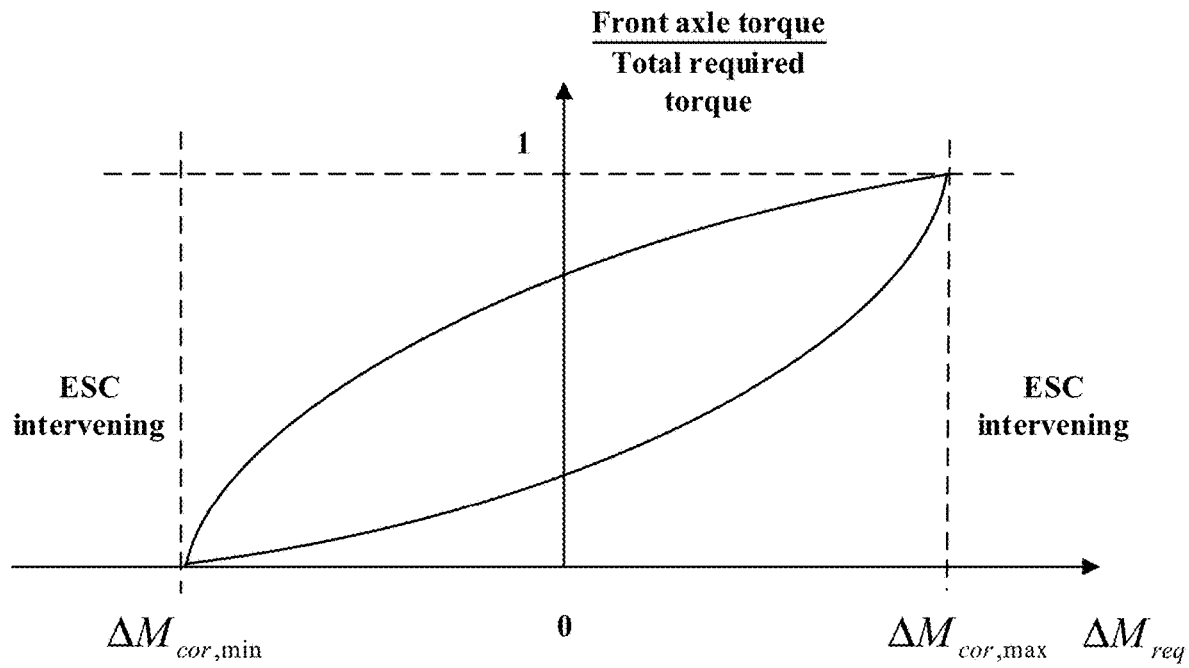
FIG. 11 is another diagram of a mapping relationship between a correction yawing moment and a torque distribution coefficient in a right-turn working condition according to this application.

In another implementation. FIG. 11 is another diagram of a mapping relationship between a correction yawing moment and a torque distribution coefficient in a right-turn working condition according to this application. As shown in FIG. 11, when the vehicle turns right, the diagram indicating the mapping relationship between a correction yawing moment and a torque distribution coefficient may be a monotonically increasing convex function curve, or may be a monotonically increasing concave function curve. If $\Delta M_{cor,min} \leq \Delta M_{req} < 0$, it may be determined that the vehicle has a trend of relative understeer. With reference to FIG. 11, it can be learned that in this case, the driving torque of the vehicle is required to be transferred to the rear axle. If $0 < \Delta M_{req} \leq \Delta M_{cor,max}$, it may be determined that the vehicle has a trend of relative oversteer. It can be learned with reference to FIG. 11 that, in this case, the driving torque of the vehicle is required to be transferred to the front axle. Further, it is assumed that an expression of the convex function or the concave function that represents the mapping relationship between a correction yawing moment and a torque distribution coefficient FIG. 11 is $y = f_2(x)$, where x is a correction yawing moment, and y is a front axle torque distribution coefficient. When $\Delta M_{cor,min} \leq \Delta M_{req} \leq \Delta M_{cor,max}$, the mapping relationship between a correction yawing moment and a torque distribution coefficient is $i_F = f_2(\Delta M_{req})$, where $i_F$ is a front axle torque distribution coefficient.

Figure 12:
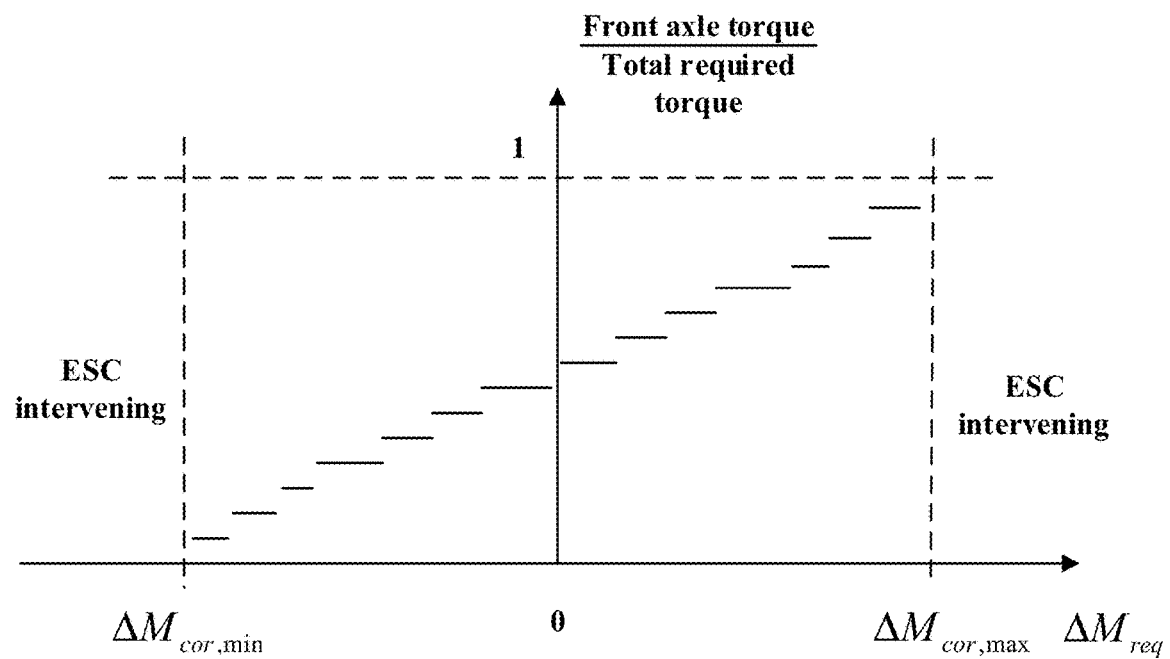
FIG. 12 is still another diagram of a mapping relationship between a correction yawing moment and a torque distribution coefficient in a right-turn working condition according to this application.

In still another implementation. FIG. 12 is still another diagram of a mapping relationship between a correction yawing moment and a torque distribution coefficient in a right-turn working condition according to this application. As shown in FIG. 12, when the vehicle turns right, the diagram indicating the mapping relationship between a correction yawing moment and a torque distribution coefficient may be a diagram in which different front axle torque distribution coefficients are used for different correction yawing moment intervals. A length of the correction yawing moment interval may be changed based on an actual requirement. This is not limited herein. If $\Delta M_{cor,min} \leq \Delta M_{req} < 0$, it may be determined that the vehicle has a trend of relative understeer. With reference to FIG. 12, it can be learned that in this case, the driving torque of the vehicle is required to be transferred to the rear axle. If $0 < \Delta M_{req} \leq \Delta M_{cor,max}$, it may be determined that the vehicle has a trend of relative oversteer. It can be learned with reference to FIG. 12 that, in this case, the driving torque of the vehicle is required to be transferred to the front axle. Further, when $\Delta M_{cor,min} \leq \Delta M_{req} \leq \Delta M_{cor,max}$, the mapping relationship between a correction yawing moment and a torque distribution coefficient may be obtained by looking up a table.

It may be understood that, regardless of whether a diagram for the mapping relationship between a correction yawing moment and a torque distribution coefficient is in a form of a straight line (as shown in FIG. 7 and FIG. 10), a curve (as shown in FIG. 8 and FIG. 11), or a fixed interval value fixed value (as shown in FIG. 9 and FIG. 12), the diagram is obtained through calculation based on the real-time correction yawing moment of the vehicle, the maximum correctable yawing moment, and the minimum correctable yawing mom, to improve steering stability and a track tracking capability of the vehicle. In addition, because a form of the fixed interval value is that a torque distribution coefficient in each yawing moment interval is a fixed value, compared with a mapping relationship in the straight line form and a mapping relationship in the curve form, a mapping relationship in the form of a fixed interval value is not flexible enough, and a capability of adapting to different working conditions of a vehicle is low. A calculation process of a mapping relationship in the curve form is complex, and processing efficiency is relatively low. A mapping relationship in the straight line form is a simple proportional relationship, and a processing process is simple. Therefore, in the foregoing three forms of mapping relationships, a calculation process of the mapping relationship in the straight line form is simpler, and processing efficiency is higher.

S104: Determine a torque distribution coefficient of the vehicle based on the current correction yawing moment and the mapping relationship, and determine front and rear axle driving torques of the vehicle based on the torque distribution coefficient of the vehicle.

The torque distribution coefficient of the vehicle may be a front axle torque distribution coefficient, or may be a rear axle torque distribution coefficient, or may be a front axle torque distribution coefficient and a rear axle torque distribution coefficient. The front and rear axle driving torques of the vehicle include a front axle driving torque and a rear axle driving torque of the vehicle.

In an implementation, when the torque distribution coefficient of the vehicle is the front axle torque distribution coefficient, the apparatus 26 for front and rear driving torque distribution of a vehicle determines the front axle torque distribution coefficient based on the current correction yawing moment and the mapping relationship, obtains a total required driving torque of the vehicle, determines a product of the front axle torque distribution coefficient and the total required driving torque of the vehicle as the front axle driving torque of the vehicle, and determines a difference between the total required driving torque of the vehicle and the front axle driving torque of the vehicle as the rear axle driving torque of the vehicle.

For example, it is assumed that the torque distribution coefficient of the vehicle is the front axle torque distribution coefficient $i_F = 0.6$, and the total required driving torque of the vehicle is $T_{req} = 300 N \cdot m$. The apparatus 26 for front and rear driving torque distribution of a vehicle may obtain the front axle driving torque $T_F = T_{req} * i_F = 180 N \cdot m$ of the vehicle through calculation, and then obtain the rear axle driving torque $T_R = T_{req} - T_F = 120 N \cdot m$ of the vehicle through calculation.

In another implementation, when the torque distribution coefficient of the vehicle is the rear axle torque distribution coefficient, the apparatus 26 for front and rear driving torque distribution of a vehicle determines a front axle torque distribution coefficient based on the current correction yawing moment and the mapping relationship, determines a difference between 1 and the front axle torque distribution coefficient as the rear axle torque distribution coefficient, obtains a total required driving torque of the vehicle, determines a product of the rear axle torque distribution coefficient and the total required driving torque of the vehicle as the rear axle driving torque of the vehicle, and determines a difference between the total required driving torque of the vehicle and the rear axle driving torque of the vehicle as the front axle driving torque of the vehicle.

For example, it is assumed that the apparatus 26 for front and rear driving torque distribution of a vehicle determines the front axle torque distribution coefficient $i_F=0.6$ based on the current correction yawing moment and the mapping relationship, and obtains the total required driving torque $T_{req}=300$N·m of the vehicle. In this case, the apparatus 26 for front and rear driving torque distribution of a vehicle obtains the torque distribution coefficient of the vehicle through calculation, that is, the rear axle torque distribution coefficient $i_R=1-i_F=0.4$, and then obtains the rear axle driving torque $T_R=T_{req}*i_R=120$N·m of the vehicle through calculation, and further obtains the front axle driving torque $T_F=T_{req}-T_R=170$N·m of the vehicle through calculation.

In still another implementation, when the torque distribution coefficient of the vehicle is the front axle torque distribution coefficient and the rear axle torque distribution coefficient, the apparatus 26 for front and rear driving torque distribution of a vehicle determines the front axle torque distribution coefficient based on the current correction yawing moment and the mapping relationship, determines a difference between 1 and the front axle torque distribution coefficient as the rear axle torque distribution coefficient, obtains a total required driving torque of the vehicle, determines a product of the front axle torque distribution coefficient and the total required driving torque of the vehicle as the front axle driving torque of the vehicle, and determines a product of the rear axle torque distribution coefficient and the total required driving torque of the vehicle as the rear axle driving torque of the vehicle.

For example, it is assumed that the apparatus 26 for front and rear driving torque distribution of a vehicle determines the front axle torque distribution coefficient $i_F=0.6$ based on the current correction yawing moment and the mapping relationship, and obtains the total required driving torque $T_{req}=300$N·m of the vehicle. In this case, the apparatus 26 for front and rear driving torque distribution of a vehicle obtains the rear axle torque distribution coefficient $i_R=1-i_F=0.4$ through calculation, and then obtains the front axle driving torque $T_F=T_{req}*i_F=180$N·m of the vehicle, and further obtains the rear axle driving torque $T_R=T_{req}*i_R=120$N·m of the vehicle through calculation.

The following describes this step by using an example in which the torque distribution coefficient of the vehicle is the front axle torque distribution coefficient and the rear axle torque distribution coefficient.

When it is determined, based on step S103, that the steering of the vehicle is to turn left:

In an embodiment, if the current correction yawing moment ΔM is greater than or equal to $\Delta M_{cor,min}$, and is less than or equal to $\Delta M_{cor,max}$, the front axle torque distribution coefficient $i_F=(\Delta M_{cor,max}-\Delta M)/(\Delta M_{cor,max}-\Delta M_{cor,min})$ may be obtained based on the mapping relationship between a correction yawing moment and a torque distribution coefficient shown in FIG. 7, or the front axle torque distribution coefficient $i_F=f_1(\Delta M)$ may be obtained based on the mapping relationship between a correction yawing moment and a torque distribution coefficient shown in FIG. 8, or the front axle torque distribution coefficient $i_F$ may be obtained based on the mapping relationship between a correction yawing moment and a torque distribution coefficient shown in FIG. 9, by looking up a table, and then the rear axle torque distribution coefficient $i_R=1-i_F$ is obtained.

In another embodiment, if $\Delta M<\Delta M_{cor,min}$, the torque distribution coefficient of the vehicle may be a first preset coefficient, for example, $i_F=1$, or $i_R=0$; or if $\Delta M>\Delta M_{cor,max}$, the torque distribution coefficient of the vehicle may be a second preset coefficient, for example, $i_F=0$, or $i_R=1$.

When it is determined, based on step S103, that the steering of the vehicle is to turn right:

In an embodiment, if $\Delta M_{cor,min}\leq \Delta M\leq \Delta M_{cor,max}$, the front axle torque distribution coefficient $i_F=(\Delta M-\Delta M_{cor,min})/(\Delta M_{cor,max}-\Delta M_{cor,min})$ may be obtained based on the mapping relationship between a correction yawing moment and a torque distribution coefficient shown in FIG. 10, or the front axle torque distribution coefficient $i_F=f_2(\Delta M)$ may be obtained based on the mapping relationship between a correction yawing moment and a torque distribution coefficient shown in FIG. 11, or the front axle torque distribution coefficient $i_F$ may be obtained based on the mapping relationship between a correction yawing moment and a torque distribution coefficient shown in FIG. 12, by looking up a table, and then the rear axle torque distribution coefficient $i_R=1-i_F$ is obtained.

In another embodiment, if $\Delta M<\Delta M_{cor,min}$, the torque distribution coefficient of the vehicle may be a third preset coefficient, for example, $i_F=0$, or $i_R=1$; or if $\Delta M>\Delta M_{cor,max}$, the torque distribution coefficient of the vehicle may be a fourth preset coefficient, for example, $i_F=1$, or $i_R=0$.

Then, the total required driving torque of the vehicle is determined, the front and rear axle driving torques of the vehicle are determined based on the total required driving torque and the torque distribution coefficient, and the front and rear axle driving torques are sent to corresponding motor controllers.

Specifically, the apparatus 26 for front and rear driving torque distribution of a vehicle may obtain an accelerator pedal location of the accelerator pedal 21, obtain a first output driving torque through calculation based on the accelerator pedal location, obtain a current effective power of the power battery in the battery management system 25, determine, based on the current effective power of the power battery, a second output driving torque supported by the power battery, and determine a minimum value of the first output driving torque and the second output driving torque as the total required driving torque $T_{req}$ of the vehicle. The front axle driving torque $T_F=T_{req}*i_F$ and the rear axle driving torque $T_R=T_{req}*i_R$ of the vehicle are obtained through calculation based on the total required driving torque $T_{req}$, the front axle torque distribution coefficient $i_F$, and the rear axle torque distribution coefficient $i_R$.

Then, a principle of a proportional relationship between vertical loads of wheels on a same axle may be used, that is, the front axle driving torque $T_F$ and the rear axle driving torque $T_R$ are separately distributed based on proportions of vertical loads of wheels on a same axle to a vertical load corresponding to the axle, to obtain $T_{FL}$, $T_{FR}$, $T_{RL}$, and $T_{RR}$. For example, $T_{FL}=T_F*F_{z,FL}/(F_{z,FL}+F_{z,FR})$ and $T_{FR}=T_F*F_{z,FR}/(F_{z,FL}+F_{z,FR})$ are obtained based on a vertical load $F_{z,FL}$ of the left front wheel and a vertical load $F_{z,FR}$ of the right front wheel. After $T_{FL}$, $T_{FR}$, $T_{RL}$, and $T_{RR}$ are obtained, $T_{FL}$, $T_{FR}$, $T_{RL}$, and $T_{RR}$ are sent to motor controllers of the wheels, and the motor controller of each wheel controls a drive motor of each wheel to run. In the foregoing manner, the front and rear axle driving torques of the vehicle may be dynamically distributed to each wheel in real time based on a change of the vertical load of each wheel, to implement dynamic distribution of the driving torque of the wheel.

Further, the front axle driving torque $T_F$ and the rear axle driving torque $T_R$ may be equally divided, based on a principle of equal division, to obtain a driving torque $T_{FL}=T_F/2$ of the left front wheel, a driving torque $T_{FR}=T_F/2$ of the right front wheel, a driving torque $T_{RL}=T_R/2$ of the left rear wheel, and a driving torque $T_{RR}=T_R/2$ of the right rear wheel. In actual implementation, after $T_F$ and $T_R$ are obtained, $T_F$ are $T_R$ respectively sent to the front axle motor controller 27 and the rear axle motor controller 28. The front axle motor controller 27 controls the front drive motor 29 to run, the front drive motor 29 equally divides $T_F$ by using the differential, and outputs equally divided parts to the left front wheel and the right front wheel, respectively. The rear axle motor controller 28 controls and drives the rear drive motor 210 to run, and the rear drive motor 210 equally divides $T_R$ by using the differential, and outputs equally divided parts to the left rear wheel and the right rear wheel, respectively.

It should be noted that, for an electric vehicle driven in a front-to-rear centralized manner (front and rear axle double motor drive-type electric vehicle), in a process of distributing a driving torque on each axle to a left wheel and a right wheel corresponding to each axle, driving torques on the front and the rear axles may be directly equally distributed to the left wheel and the right wheel corresponding to each axle by using the foregoing equal division principle. In this manner, no additional hardware is required for the electric vehicle driven in a front-to-rear centralized manner, and hardware costs are low. However, when the foregoing principle of a proportional relationship between vertical loads of wheels on a same axle is used, a torque conversion apparatus is required to be added on the basis of original hardware, resulting in higher hardware costs.

Further, when $\Delta M<\Delta M_{cor,min}$ or $\Delta M>\Delta M_{cor,max}$, the apparatus 26 for front and rear driving torque distribution of a vehicle sends a correction trigger instruction to the ESC controller 241, to trigger the ESC controller 241 to output the braking torque of each wheel.

Specifically, after the ESC controller 241 receives the correction trigger instruction sent by the apparatus 26 for front and rear driving torque distribution of a vehicle, the single wheel braking torque distribution strategy can be adopted, and the calculation is based on the current correction yawing moment $\Delta M$ and the front wheel angle $\delta_f$ of the vehicle. The braking torque of each wheel is obtained. A calculation process is as follows:

When the steering of the vehicle is to turn left, if $\Delta M<\Delta M_{cor,min}$, because $\Delta M_{cor,min}<0$, it may be determined that the vehicle has a trend of oversteer. The ESC controller 241 obtains $T_{bfl}=T_{brl}=T_{brr}=0$ and $T_{bfr}=T_{FR}+R*|\Delta M|/d_1$ through calculation, where $d_1=|l_r*\cos \delta_f/2+l_f*\sin \delta_f|$, $T_{bfl}$ is a braking torque of the left front wheel, and $T_{bfr}$ is a braking torque of the right front wheel, $T_{brl}$ is the braking torque of the left rear wheel, $T_{brr}$ is the braking torque of the right rear wheel, and R is a wheel rolling radius; or if $\Delta M>\Delta M_{cor,max}$, because $\Delta M_{cor,max}>0$, it may be determined that the vehicle has a trend of relative understeer, and the ESC controller 241 obtains $T_{bfl}=T_{bfr}=T_{brr}=0$, $T_{brl}=T_{RL}+R*|\Delta M|/d_2$, and $d_2=2/l_r$ through calculation.

When the steering of the vehicle is to turn right, if $\Delta M<\Delta M_{cor,min}$, because $\Delta M_{cor,min}<0$, it may be determined that the vehicle has a trend of relative understeer, and the ESC controller 241 obtains $T_{bfl}=T_{brl}=T_{bfr}=0$, $T_{brr}=T_{RR}+$ $R*|\Delta M|/d_2$ through calculation; or if $\Delta M>\Delta M_{cor,max}$, because $\Delta M_{cor,max}>0$, it may be determined that the vehicle has a trend of relative oversteer, and the ESC controller 241 obtains $T_{bfr}=T_{bfl}=T_{brr}=0$, $T_{bfl}=T_{FL}+R*|\Delta M|/d_3$, and $d_3=|l_r*\cos \delta_f/2-l_f*\sin \delta_f|$ through calculation.

Then, the ESC controller 241 outputs the braking torque of each wheel to the wheel braking apparatus 242 (for example, a caliper) corresponding to each wheel, to correct the steering status of the vehicle.

Figure 13:
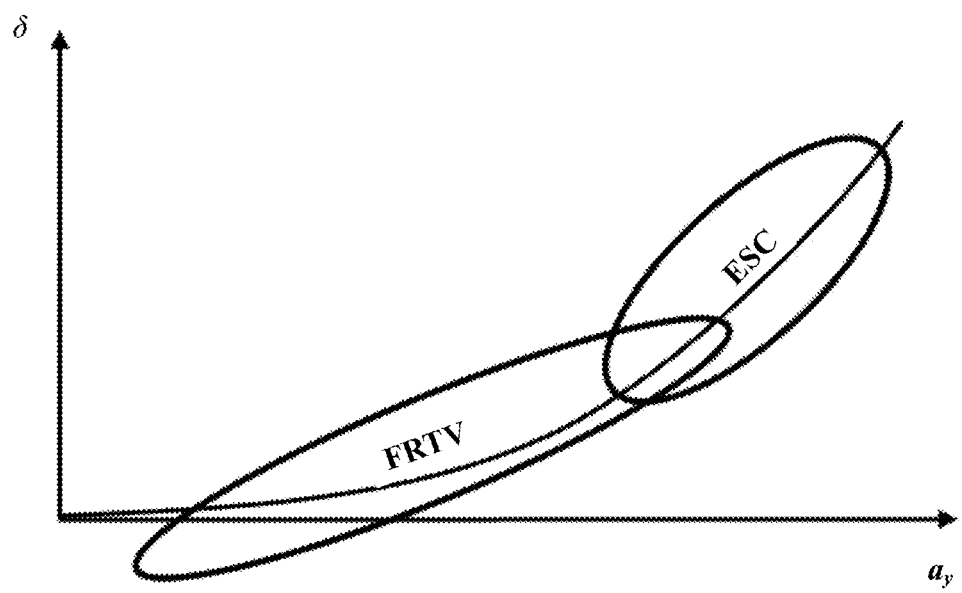
FIG. 13 is a schematic diagram of working ranges of FRTV and ESC according to this application.
Figure 13:
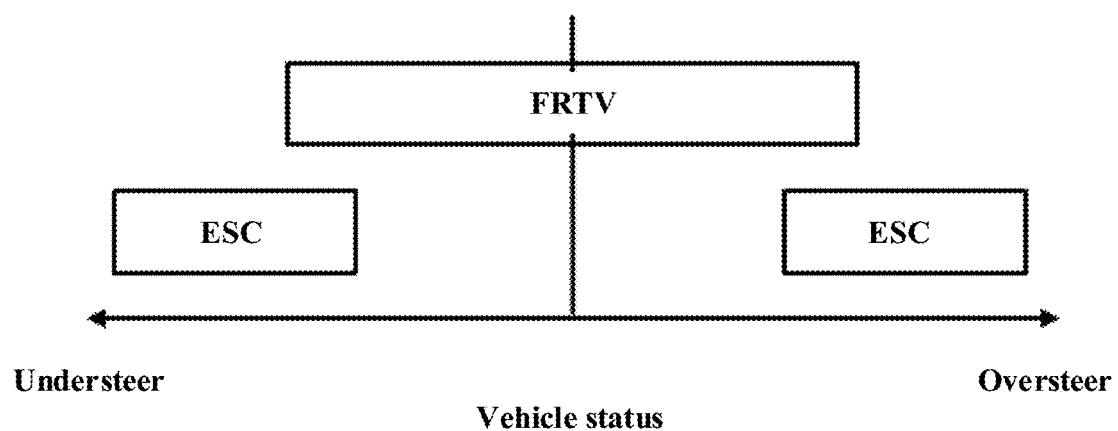

Further, FIG. 13 is a schematic diagram of working ranges of FRTV and ESC according to this application. Front to rear torque vectoring (FRTV) is also referred to as indirect yawing moment control, which has a specific limit on vehicle stability control. A policy for controlling torque distribution between front and rear axles works in the tire linear range, and the vehicle is in a non-limit working condition, mainly to improve operation stability of the vehicle in a common steering working condition. ESC control policy works in the tire non-linear range, mainly to improve stability of the vehicle in a limit working condition. FIG. 13 shows a comparison between a working range of the front to rear torque vectoring (FRTV) and a working range of ESC. Both the front to rear torque vectoring (FRTV) and ESC can work in the critical range between the tire linear range and the non-linear range, and therefore the policy for controlling torque distribution between front and rear axles can increase a trigger threshold of a conventional ESC function, reduce a frequency of intervening of ESC, and improve smoothness of vehicle in traveling.

According to the method for torque distribution between front and rear axles provided in this application, in a case of working in the tire linear area, the torque distribution between front and rear axles can be dynamically performed based on the real-time steering in the steering condition of the vehicle, the real-time current correction yawing moment of the vehicle, and the real-time mapping relationship between a correction yawing moment and a torque distribution coefficient, to improve operation stability and a track tracking capability of the vehicle in the steering working condition, and reduce a probability of intervening of ESC.

Figure 14:
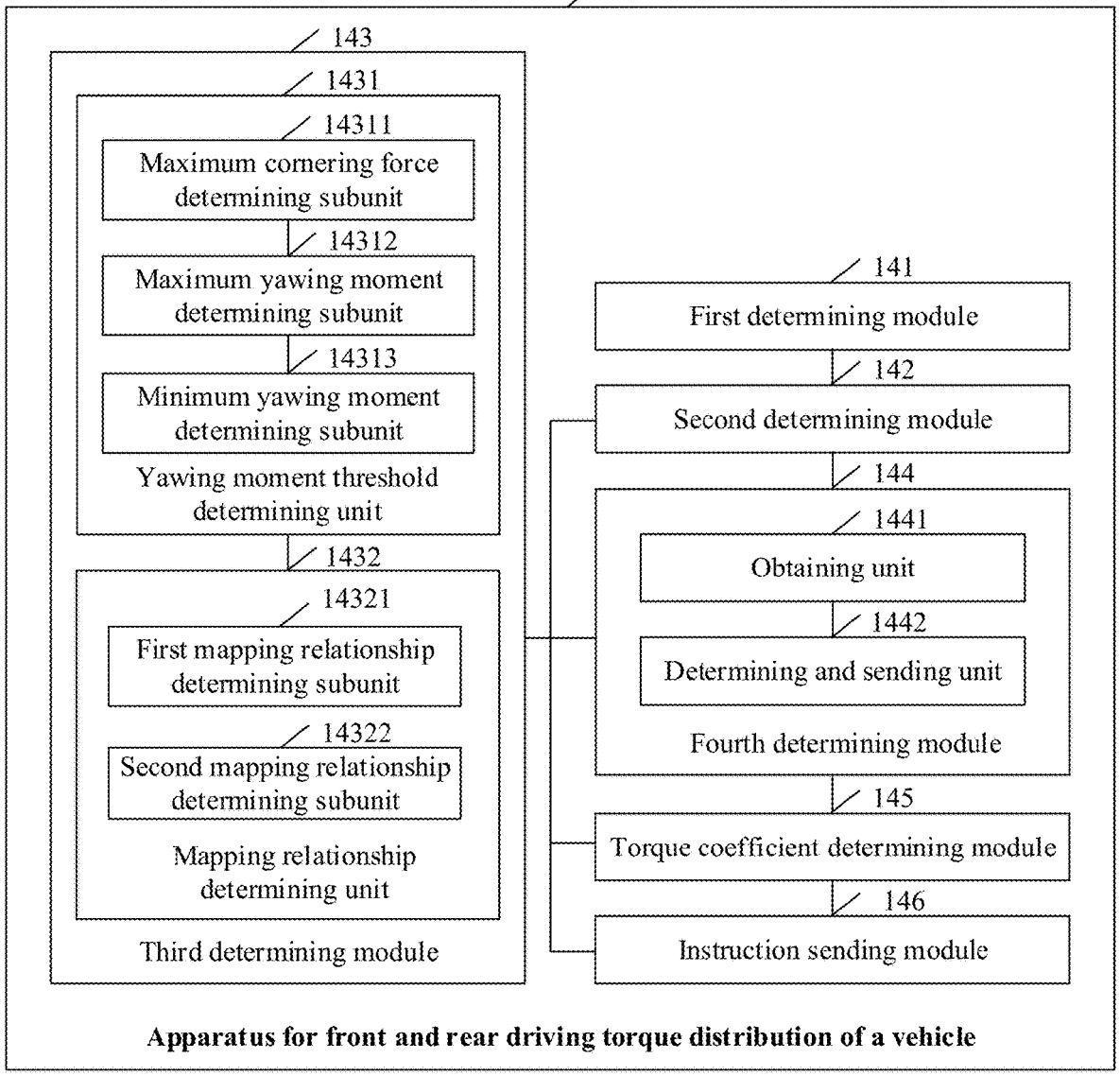
FIG. 14 is a schematic diagram of a structure of an apparatus for front and rear driving torque distribution of a vehicle according to this application.

FIG. 14 is a schematic diagram of a structure of an apparatus for front and rear driving torque distribution of a vehicle according to this application. As shown in FIG. 14, the apparatus 14 for front and rear driving torque distribution of a vehicle may include a first determining module 141, a second determining module 142, a third determining module 143, and a fourth determining module 144.

The first determining module 141 is configured to determine, based on a wheel angle of a vehicle, an expected status parameter existing during steering of the vehicle.

The second determining module 142 is configured to determine a correction yawing moment based on an actual status parameter existing during the steering of the vehicle and the expected status parameter.

The third determining module 143 is configured to determine a mapping relationship between a correction yawing moment and a torque distribution coefficient based on the wheel angle and acceleration information of the vehicle.

The fourth determining module 144 is configured to: determine a torque distribution coefficient of the vehicle based on the current correction yawing moment and the mapping relationship, and determine front and rear axle driving torques of the vehicle based on the torque distribution coefficient of the vehicle.

In some feasible implementations, the third determining module 143 includes:
- a yawing moment threshold determining unit 1431, configured to determine a maximum correctable yawing moment and a minimum correctable yawing moment based on the wheel angle and the acceleration information; and
- a mapping relationship determining unit 1432, configured to determine the mapping relationship based on the wheel angle, the maximum correctable yawing moment, and the minimum correctable yawing moment.

In some feasible implementations, the mapping relationship determining unit 1432 includes:
- a first mapping relationship determining subunit 14321, configured to: if it is determined, based on the wheel angle, that the steering of the vehicle is to turn left, a mapping relationship is $i=(\Delta M_{cor,max}-\Delta M_{req})/(\Delta M_{cor,max}-\Delta M_{cor,min})$, where i is the torque distribution coefficient, $\Delta M_{cor,max}$ is the maximum correctable yawing moment, $\Delta M_{cor,min}$ is the minimum correctable yawing moment, $\Delta M_{req}$ is the correction yawing moment, and $\Delta M_{cor,min} \leq \Delta M_{req} \leq \Delta M_{cor,max}$.

In some feasible implementations, the mapping relationship determining unit 1432 further includes:
- a second mapping relationship determining subunit 14322, configured to: if it is determined, based on the wheel angle, that the steering of the vehicle is to turn right, determining that the mapping relationship is $i=(\Delta M_{req}-\Delta M_{cor,min})/(\Delta M_{cor,max}-\Delta M_{cor,min})$, where i is the torque distribution coefficient, $\Delta M_{cor,max}$ is the maximum correctable yawing moment, $\Delta M_{cor,min}$ is the minimum correctable yawing moment, $\Delta M_{req}$ is the correction yawing moment, and $\Delta M_{cor,min} \leq \Delta M_{req} \leq \Delta M_{cor,max}$.

In some feasible implementations, the yawing moment threshold determining unit 1431 is configured to: obtain a current road surface adhesion coefficient of the vehicle, and determine the maximum correctable yawing moment and the minimum correctable yawing moment based on the road surface adhesion coefficient, the wheel angle, and the acceleration information.

In some feasible implementations, the yawing moment threshold determining unit 1431 includes:
- a maximum cornering force determining subunit 14311, configured to determine a maximum front axle cornering force and a maximum rear axle cornering force of the vehicle based on the road surface adhesion coefficient and the acceleration information;
- a maximum yawing moment determining subunit 14312, configured to determine the maximum correctable yawing moment based on the maximum front axle cornering force and the wheel angle; and
- a minimum yawing moment determining subunit 14313, configured to determine the minimum correctable yawing moment based on the maximum rear axle cornering force.

In some feasible implementations, the acceleration information includes a longitudinal acceleration and a lateral acceleration; and
the maximum cornering force determining subunit 14311 is configured to:
- determine a vertical load of each wheel based on the longitudinal acceleration and the lateral acceleration; and
- determine the maximum front axle cornering force and the maximum rear axle cornering force based on the vertical load of each wheel and the road surface adhesion coefficient.

In some feasible implementations, the maximum cornering force determining subunit 14311 is configured to:
- determine a minimum value of vertical loads of all front wheels as a corrected front axle-wheel vertical load, and determine a minimum value of vertical loads of all rear wheels as a corrected rear axle-wheel vertical load;
- determine the maximum front axle cornering force based on the corrected front axle-wheel vertical load and the road surface adhesion coefficient; and
- determine the maximum rear axle cornering force based on the corrected rear axle-wheel vertical load and the road surface adhesion coefficient.

In some feasible implementations, the apparatus further includes:
- a torque coefficient determining module 145, configured to: if it is determined, based on the wheel angle, that the steering of the vehicle is to turn left, and the correction yawing moment is less than the minimum correctable yawing moment, determine the torque distribution coefficient of the vehicle as a first preset coefficient;
- if it is determined, based on the wheel angle, that the steering of the vehicle is to turn left, and the correction yawing moment is greater than the maximum correctable yawing moment, determine the torque distribution coefficient of the vehicle as a second preset coefficient;
- if it is determined, based on the wheel angle, that the steering of the vehicle is to turn right, and the correction yawing moment is less than the minimum correctable yawing moment, determine the torque distribution coefficient of the vehicle as a third preset coefficient; or
- if it is determined, based on the wheel angle, that the steering of the vehicle is to turn right, and the correction yawing moment is greater than the maximum correctable yawing moment, determine the torque distribution coefficient of the vehicle as a fourth preset coefficient.

In some feasible implementations, the apparatus further includes:
- an instruction sending module 146, configured to: if the current correction yawing moment is less than the minimum correctable yawing moment, or the current correction yawing moment is greater than the maximum correctable yawing moment, send a correction trigger instruction to an electronic stability control system ESC, to trigger the ESC to output a braking torque of each wheel.

In some feasible implementations, the actual status parameter includes an actual yaw velocity and an actual centroid side-slip angle, and the expected status parameter includes an expected yaw velocity and an expected centroid side-slip angle.

The second determining module 142 is configured to:
- determine the current correction yawing moment of the vehicle based on a deviation between the actual yaw velocity and the expected yaw velocity and a deviation between the actual centroid side-slip angle and the expected centroid side-slip angle.

In some feasible implementations, the fourth determining module 144 includes:
- an obtaining unit 1441, configured to obtain a total required driving torque of the vehicle; and
- a determining and sending unit 1442, configured to determine the front and rear axle driving torques of the vehicle based on the total required driving torque and the torque distribution coefficient, and send the front and rear axle driving torques to corresponding motor controllers.

It may be understood that the apparatus 14 for front and rear driving torque distribution of a vehicle is configured to implement the steps performed by the apparatus for front and rear driving torque distribution of a vehicle in the embodiment shown in FIG. 4. For a specific implementation and corresponding beneficial effects of the function blocks included in the apparatus 14 for front and rear driving torque distribution of a vehicle in FIG. 14, refer to the specific description of the foregoing embodiment in FIG. 4. Details are not described herein again.

Figure 15:
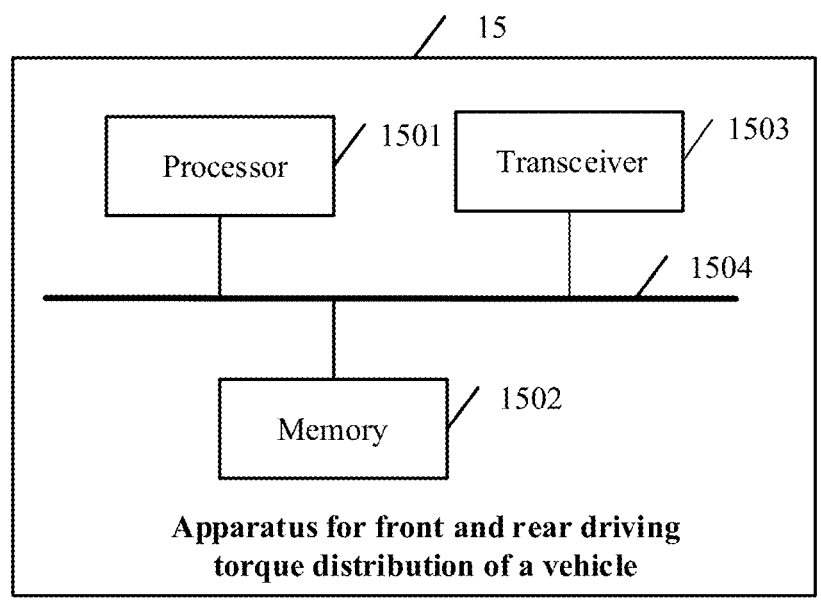
FIG. 15 is another schematic diagram of a structure of an apparatus for front and rear driving torque distribution of a vehicle according to this application.

FIG. 15 is another schematic diagram of a structure of an apparatus for front and rear driving torque distribution of a vehicle according to this application. As shown in FIG. 15, the apparatus 15 for front and rear driving torque distribution of a vehicle may include one or more processors 1501, a memory 1502, and a transceiver 1503. The processor 1501, the memory 1502, and the transceiver 1503 are connected through the bus 1504. The transceiver 1503 is configured to receive or send data. The memory 1502 is configured to store a computer program, and the computer program includes program instructions. The processor 1501 is configured to execute the program instructions stored in the memory 1502, to perform the following operations:

determining, based on a wheel angle of a vehicle, an expected status parameter existing during steering of a vehicle;

determining a current correction yawing moment based on an actual status parameter existing during the steering of the vehicle and the expected status parameter;

determining a mapping relationship between a correction yawing moment and a torque distribution coefficient based on the wheel angle and acceleration information of the vehicle;

determining a torque distribution coefficient of the vehicle based on the current correction yawing moment and the mapping relationship; and determining front and rear axle driving torques of the vehicle based on the torque distribution coefficient of the vehicle.

In some feasible implementations, the processor 1501 determines a mapping relationship between a correction yawing moment and a torque distribution coefficient based on the wheel angle and the acceleration information of the vehicle, and specifically performs the following steps:

determining a maximum correctable yawing moment and a minimum correctable yawing moment based on the wheel angle and the acceleration information; and determining the mapping relationship based on the wheel angle, the maximum correctable yawing moment, and the minimum correctable yawing moment.

In some feasible implementations, the processor 1501 determines the mapping relationship based on the wheel angle, the maximum correctable yawing moment, and the minimum correctable yawing moment, and specifically performs the following step:

if it is determined, based on the wheel angle, that the steering of the vehicle is to turn left, determining that the mapping relationship is $i=(\Delta M_{cor,max}-\Delta M_{req})/(\Delta M_{cor,max}-\Delta M_{cor,min})$, where i is the torque distribution coefficient, $\Delta M_{cor,max}$ is the maximum correctable yawing moment, $\Delta M_{cor,min}$ is the minimum correctable yawing moment, $\Delta M_{req}$ is the correction yawing moment, and $\Delta M_{cor,min} \leq \Delta M_{req} \leq \Delta M_{cor,max}$.

In some feasible implementations, the processor 1501 determines the mapping relationship based on the wheel angle, the maximum correctable yawing moment, and the minimum correctable yawing moment, and specifically performs the following step:

if it is determined, based on the wheel angle, that the steering of the vehicle is to turn right, determining that the mapping relationship is $(\Delta M_{req}-\Delta M_{cor,min})/(\Delta M_{cor,max}-\Delta M_{cor,min})$, where i is the torque distribution coefficient, $\Delta M_{cor,max}$ is the maximum correctable yawing moment, $\Delta M_{cor,min}$ is the minimum correctable yawing moment, $\Delta M_{req}$ is the correction yawing moment, and $\Delta M_{cor,min} \leq \Delta M_{req} \leq \Delta M_{cor,max}$.

In some feasible implementations, the processor 1501 determines the maximum correctable yawing moment and the minimum correctable yawing moment based on the wheel angle and the acceleration information, and specifically performs the following step:

obtaining a current road surface adhesion coefficient of the vehicle, and determining the maximum correctable yawing moment and the minimum correctable yawing moment based on the road surface adhesion coefficient, the wheel angle, and the acceleration information.

In some feasible implementations, the processor 1501 determines the maximum correctable yawing moment and the minimum correctable yawing moment based on the road surface adhesion coefficient, the wheel angle, and the acceleration information, and specifically performs the following steps:

determining a maximum front axle cornering force and a maximum rear axle cornering force of the vehicle based on the road surface adhesion coefficient and the acceleration information;

determining the maximum correctable yawing moment based on the maximum front axle cornering force and the wheel angle; and determining the minimum correctable yawing moment based on the maximum rear axle cornering force.

In some feasible implementations, the acceleration information includes a longitudinal acceleration and a lateral acceleration.

The processor 1501 determines the maximum front axle cornering force and the maximum rear axle cornering force of the vehicle based on the road surface adhesion coefficient and the acceleration information, and specifically performs the following steps:

determining a vertical load of each wheel based on the longitudinal acceleration and the lateral acceleration; and determining the maximum front axle cornering force and the maximum rear axle cornering force based on the vertical load of each wheel and the road surface adhesion coefficient.

In some feasible implementations, the processor 1501 determines the maximum front axle cornering force and the maximum rear axle cornering force based on the vertical load of each wheel and the road surface adhesion coefficient, and specifically performs the following steps:

determining a minimum value of vertical loads of all front wheels as a corrected front axle-wheel vertical load, and determining a minimum value of vertical loads of all rear wheels as a corrected rear axle-wheel vertical load;

determining the maximum front axle cornering force based on the corrected front axle-wheel vertical load and the road surface adhesion coefficient; and determining the maximum rear axle cornering force based on the corrected rear axle-wheel vertical load and the road surface adhesion coefficient.

In some feasible implementations, the processor 1501 further specifically performs the following step:
- if it is determined, based on the wheel angle, that the steering of the vehicle is to turn left, and the correction yawing moment is less than the minimum correctable yawing moment, determining the torque distribution coefficient of the vehicle as a first preset coefficient;
- if it is determined, based on the wheel angle, that the steering of the vehicle is to turn left, and the correction yawing moment is greater than the maximum correctable yawing moment, determining the torque distribution coefficient of the vehicle as a second preset coefficient;
- if it is determined, based on the wheel angle, that the steering of the vehicle is to turn right, and the correction yawing moment is less than the minimum correctable yawing moment, determining the torque distribution coefficient of the vehicle as a third preset coefficient; or
- if it is determined, based on the wheel angle, that the steering of the vehicle is to turn right, and the correction yawing moment is greater than the maximum correctable yawing moment, determining the torque distribution coefficient of the vehicle as a fourth preset coefficient.

In some feasible implementations, the processor 1501 further specifically performs the following step:
- if the current correction yawing moment is less than the minimum correctable yawing moment, or the current correction yawing moment is greater than the maximum correctable yawing moment, sending a correction trigger instruction to an electronic stability control system ESC, to trigger the ESC to output a braking torque of each wheel.

In some feasible implementations, the actual status parameter includes an actual yaw velocity and an actual centroid side-slip angle, and the expected status parameter includes an expected yaw velocity and an expected centroid side-slip angle.

The processor 1501 determines the current correction yawing moment based on the actual status parameter existing during the steering of the vehicle and the expected status parameter, and specifically performs the following step:
- determining the current correction yawing moment of the vehicle based on a deviation between the actual yaw velocity and the expected yaw velocity and a deviation between the actual centroid side-slip angle and the expected centroid side-slip angle.

In some feasible implementations, the processor 1501 determines the front and rear axle driving torques of the vehicle based on the torque distribution coefficient of the vehicle, and specifically performs the following steps:
- obtaining a total required driving torque of the vehicle; and
- determining the front and rear axle driving torques of the vehicle based on the total required driving torque and the torque distribution coefficient, and sending the front and rear axle driving torques to corresponding motor controllers.

It may be understood that the apparatus 15 for front and rear driving torque distribution of a vehicle is configured to implement the steps performed by the apparatus for front and rear driving torque distribution of a vehicle in the embodiment shown in FIG. 4.

In this application, the apparatus 15 for front and rear driving torque distribution of a vehicle may dynamically perform torque distribution between front and rear axles based on real-time steering of the vehicle in a steering condition, the current correction yawing moment of the vehicle, and the mapping relationship between a correction yawing moment and a torque distribution coefficient, to improve operation stability and a track tracking capability of the vehicle in a steering working condition, and reduce a probability of intervening of ESC.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the devices or units, or electrical connections, mechanical connections, or connections in other forms.

A person of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a removable storage device, a read-only memory (ROM), a random access memory (RAM), a magnetic disk, or an optical disc.

When the foregoing integrated unit of the present invention is implemented in the form of a software functional module and sold or used as an independent product, the integrated unit may be stored in a computer-readable storage medium. Based on such understanding, the technical solutions in embodiments of the present invention can be essential or the part that contributes to the conventional technology can be embodied in the form of a software product. This computer software product is stored in a storage medium, and includes several instructions for instructing a computer device (which can be a personal computer, a server, or a network device) to perform all or some of the steps of the method described in the embodiments of the present invention. The foregoing storage medium includes various media that can store program code, such as a removable storage device, a ROM, a RAM, a magnetic disk, or a compact disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method performed by a controller for front and rear driving torque distribution to axles of a vehicle, the method comprising:
   - determining, based on a wheel angle of the vehicle, an expected status parameter existing during steering of the vehicle;

determining a current correction yawing moment based on an actual status parameter existing during the steering of the vehicle and the expected status parameter;

determining a mapping relationship between a correction yawing moment and a torque distribution coefficient based on the wheel angle and acceleration information of the vehicle;

determining a torque distribution coefficient of the vehicle based on the current correction yawing moment and the mapping relationship; and determining front and rear axle driving torques of the vehicle based on the torque distribution coefficient of the vehicle.

2. The method according to claim 1, wherein the step of determining the mapping relationship between the correction yawing moment and the torque distribution coefficient comprises:

determining a maximum correctable yawing moment and a minimum correctable yawing moment based on the wheel angle and the acceleration information; and determining the mapping relationship based on the wheel angle, the maximum correctable yawing moment, and the minimum correctable yawing moment.

3. The method according to claim 2, further comprising:
when it is determined, based on the wheel angle, that the steering of the vehicle is to turn left, and the correction yawing moment is less than the minimum correctable yawing moment, determining the torque distribution coefficient of the vehicle is a first preset coefficient;

when it is determined, based on the wheel angle, that the steering of the vehicle is to turn left, and the correction yawing moment is greater than the maximum correctable yawing moment, the torque distribution coefficient of the vehicle is a second preset coefficient;

when it is determined, based on the wheel angle, that the steering of the vehicle is to turn right, and the correction yawing moment is less than the minimum correctable yawing moment, the torque distribution coefficient of the vehicle is a third preset coefficient; or when it is determined, based on the wheel angle, that the steering of the vehicle is to turn right, and the correction yawing moment is greater than the maximum correctable yawing moment, the torque distribution coefficient of the vehicle is a fourth preset coefficient.

4. The method according to claim 2, further comprising:
when the current correction yawing moment is less than the minimum correctable yawing moment, or the current correction yawing moment is greater than the maximum correctable yawing moment, sending a correction trigger instruction to an electronic stability control system ESC, to trigger the ESC to output a braking torque of each wheel.

5. The method according to claim 1, wherein the actual status parameter comprises an actual yaw velocity and an actual centroid side-slip angle, and the expected status parameter comprises an expected yaw velocity and an expected centroid side-slip angle, and wherein the step of determining the current correction yawing moment based on the actual status parameter existing during the steering of the vehicle and the expected status parameter comprises:

determining the current correction yawing moment of the vehicle based on a deviation between the actual yaw velocity and the expected yaw velocity and a deviation between the actual centroid side-slip angle and the expected centroid side-slip angle.

6. The method according to claim 1, wherein the step of determining front and rear axle driving torques of the vehicle based on the torque distribution coefficient comprises:

obtaining a total required driving torque of the vehicle; and determining the front and rear axle driving torques of the vehicle based on the total required driving torque and the torque distribution coefficient, and sending the front and rear axle driving torques to corresponding motor controllers.

7. An apparatus for front and rear driving torque distribution to axles of a vehicle, comprising:
input ends and out ends;
a processor configured to perform operations of:
determining, based on a wheel angle of the vehicle, an expected status parameter existing during steering of the vehicle;

determining a current correction yawing moment based on an actual status parameter existing during the steering of the vehicle and the expected status parameter;

determining a mapping relationship between a correction yawing moment and a torque distribution coefficient based on the wheel angle and acceleration information of the vehicle;

determining a torque distribution coefficient of the vehicle based on the current correction yawing moment and the mapping relationship; and determining front and rear axle driving torques of the vehicle based on the torque distribution coefficient of the vehicle.

8. The apparatus according to claim 7, wherein the operation of determining the mapping relationship between the correction yawing moment and the torque distribution coefficient comprises:

determining a maximum correctable yawing moment and a minimum correctable yawing moment based on the wheel angle and the acceleration information; and determining the mapping relationship based on the wheel angle, the maximum correctable yawing moment, and the minimum correctable yawing moment.

9. The apparatus according to claim 8, wherein the processor is further configured to perform an operation of:
when it is determined, based on the wheel angle, that the steering of the vehicle is to turn left, and the correction yawing moment is less than the minimum correctable yawing moment, determining the torque distribution coefficient of the vehicle is a first preset coefficient;

when it is determined, based on the wheel angle, that the steering of the vehicle is to turn left, and the correction yawing moment is greater than the maximum correctable yawing moment, the torque distribution coefficient of the vehicle is a second preset coefficient;

when it is determined, based on the wheel angle, that the steering of the vehicle is to turn right, and the correction yawing moment is less than the minimum correctable yawing moment, the torque distribution coefficient of the vehicle is a third preset coefficient; or when it is determined, based on the wheel angle, that the steering of the vehicle is to turn right, and the correction yawing moment is greater than the maximum correctable yawing moment, the torque distribution coefficient of the vehicle is a fourth preset coefficient.

10. The apparatus according to claim 8, wherein the processor is further configured to perform an operation of:
when the current correction yawing moment is less than the minimum correctable yawing moment, or the current correction yawing moment is greater than the maximum correctable yawing moment, sending a correction trigger instruction to an electronic stability control system ESC, to trigger the ESC to output a braking torque of each wheel.

11. The apparatus according to claim 7, wherein the actual status parameter comprises an actual yaw velocity and an actual centroid side-slip angle, and the expected status parameter comprises an expected yaw velocity and an expected centroid side-slip angle, and wherein the operation of determining the current correction yawing moment based on the actual status parameter existing during the steering of the vehicle and the expected status parameter comprises:
determining the current correction yawing moment of the vehicle based on a deviation between the actual yaw velocity and the expected yaw velocity and a deviation between the actual centroid side-slip angle and the expected centroid side-slip angle.

12. The apparatus according to claim 7, wherein the operation of determining front and rear axle driving torques of the vehicle based on the torque distribution coefficient comprises:
obtaining a total required driving torque of the vehicle; and
determining the front and rear axle driving torques of the vehicle based on the total required driving torque and the torque distribution coefficient, and sending the front and rear axle driving torques to corresponding motor controllers.

13. A vehicle comprising:
a front axle motor controller;
a rear axle motor controller;
an apparatus for front and rear driving torque distribution to wheels of the vehicle, wherein the apparatus has output ends connected to the front axle motor controller and the rear axle motor controller, and is configured to perform operations of:
determining, based on a wheel angle of the vehicle, an expected status parameter existing during steering of the vehicle;
determining a current correction yawing moment based on an actual status parameter existing during the steering of the vehicle and the expected status parameter;
determining a mapping relationship between a correction yawing moment and a torque distribution coefficient based on the wheel angle and acceleration information of the vehicle;
determining a torque distribution coefficient of the vehicle based on the current correction yawing moment and the mapping relationship; and
determining front and rear axle driving torques of the vehicle based on the torque distribution coefficient of the vehicle.

14. The vehicle according to claim 13, wherein the operation of determining the mapping relationship between the correction yawing moment and the torque distribution coefficient comprises:
determining a maximum correctable yawing moment and a minimum correctable yawing moment based on the wheel angle and the acceleration information; and
determining the mapping relationship based on the wheel angle, the maximum correctable yawing moment, and the minimum correctable yawing moment.

15. The vehicle according to claim 14, wherein the apparatus is further configured to perform an operation of:
when it is determined, based on the wheel angle, that the steering of the vehicle is to turn left, and the correction yawing moment is less than the minimum correctable yawing moment, determining the torque distribution coefficient of the vehicle is a first preset coefficient;
when it is determined, based on the wheel angle, that the steering of the vehicle is to turn left, and the correction yawing moment is greater than the maximum correctable yawing moment, the torque distribution coefficient of the vehicle is a second preset coefficient;
when it is determined, based on the wheel angle, that the steering of the vehicle is to turn right, and the correction yawing moment is less than the minimum correctable yawing moment, the torque distribution coefficient of the vehicle is a third preset coefficient; or
when it is determined, based on the wheel angle, that the steering of the vehicle is to turn right, and the correction yawing moment is greater than the maximum correctable yawing moment, the torque distribution coefficient of the vehicle is a fourth preset coefficient.

16. The vehicle according to claim 14, wherein the apparatus is further configured to perform an operation of:
when the current correction yawing moment is less than the minimum correctable yawing moment, or the current correction yawing moment is greater than the maximum correctable yawing moment, sending a correction trigger instruction to an electronic stability control system ESC, to trigger the ESC to output a braking torque of each wheel.

17. The vehicle according to claim 13, wherein the actual status parameter comprises an actual yaw velocity and an actual centroid side-slip angle, and the expected status parameter comprises an expected yaw velocity and an expected centroid side-slip angle, and wherein the operation of determining the current correction yawing moment based on the actual status parameter existing during the steering of the vehicle and the expected status parameter comprises:
determining the current correction yawing moment of the vehicle based on a deviation between the actual yaw velocity and the expected yaw velocity and a deviation between the actual centroid side-slip angle and the expected centroid side-slip angle.

18. The vehicle according to claim 13, wherein the operation of determining front and rear axle driving torques of the vehicle based on the torque distribution coefficient comprises:
obtaining a total required driving torque of the vehicle; and
determining the front and rear axle driving torques of the vehicle based on the total required driving torque and the torque distribution coefficient, and sending the front and rear axle driving torques to the front axle motor controller and the rear axle motor controller, respectively.

* * * * *